United States Patent
Nilsson et al.

(10) Patent No.: US 7,885,608 B2
(45) Date of Patent: Feb. 8, 2011

(54) METHODS AND DEVICES FOR ADJUSTMENT OF TRANSMISSION PARAMETERS

(75) Inventors: Johan Nilsson, Höllyiken (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 11/722,237
(22) PCT Filed: Dec. 19, 2005
(86) PCT No.: PCT/EP2005/013647

§ 371 (c)(1),
(2), (4) Date: Sep. 18, 2009

(87) PCT Pub. No.: WO2006/066844

PCT Pub. Date: Jun. 29, 2006

(65) Prior Publication Data

US 2010/0004015 A1 Jan. 7, 2010

Related U.S. Application Data

(60) Provisional application No. 60/646,313, filed on Jan. 24, 2005.

(30) Foreign Application Priority Data

Dec. 20, 2004 (EP) ................................. 04030109

(51) Int. Cl.
*H04B 1/00* (2006.01)
*H04B 7/00* (2006.01)

(52) U.S. Cl. .................. 455/69; 455/458; 455/522; 455/515

(58) Field of Classification Search .............. 455/522, 455/69, 423, 424, 425, 67.11, 226.1, 67.13, 455/67.16, 3.01, 3.05, 420, 452.1, 452.2, 455/458, 24, 509, 515, 516; 370/328, 336; 375/250

See application file for complete search history.

(56) References Cited

U.S. PATENT DOCUMENTS

| 7,409,222 B2 * | 8/2008 | You et al. ................... 455/522 |
| 2008/0198814 A1 * | 8/2008 | Wengerter et al. .......... 370/336 |
| 2009/0323592 A1 * | 12/2009 | Terry .......................... 370/328 |

FOREIGN PATENT DOCUMENTS

| EP | 1197007 B1 | 5/2000 |
| WO | WO 02/23764 A2 | 9/2001 |

OTHER PUBLICATIONS

3GPP standard "UE radio transmission and reception (FDD)" 3GPP TS 25.101, (Mar. 2002).
3GPP specification "Physical Layer Procedures (FDD)" 3GPP TS 25.214, (Sep. 2004).

* cited by examiner

*Primary Examiner*—John Lee

(57) ABSTRACT

Methods and devices in a wireless communication system are provided, in which a first portion and a second portion of signals are transmitted on a physical channel to a first transceiver from a second transceiver. A method for controlling transmission parameters in the wireless communication system comprises the steps of: transmitting an indication indicating that the first and the second receiver processing algorithms are used in the first transceiver to process the first and second portions, respectively, of signals received on the physical channel; receiving the indication at the second transceiver; and adjusting, at the second transceiver in response to the indication, a transmission parameter for at least one of the first and second portions of signals to be transmitted on the physical channel to the first transceiver. The indication could be transmitted from the first transceiver, or it could be determined through evaluations carried out at the second transceiver.

47 Claims, 13 Drawing Sheets

METHODS AND DEVICES FOR ADJUSTMENT OF TRANSMISSION PARAMETERS

This application claims the benefit of U.S. Provisional Application No. 60/646,313, filed Jan. 24, 2005, the disclosure of which is fully incorporated herein by reference.

TECHNICAL FIELD

The present invention relates to the field of wireless communication. More particularly, it relates to methods and devices for adjusting at least one transmission parameters for one or more portions of a signal to be transmitted on a physical channel.

BACKGROUND

Wireless communication systems exist in various forms. Typically, a wireless communication system could include one or more wireless terminals and one or more base stations. In a cellular system for wireless communication, each wireless terminal in the system is connected to one or more base stations via radio communication. The base stations can be part of a serving network (NW), which could also include other entities for controlling the traffic in the system, such as e.g. a Radio Network Controller (RNC). Transmission from a wireless terminal to a base station is called uplink (UL) transmission, and transmission from a base station to a wireless terminal is denoted downlink (DL) transmission.

In a wireless communication system, different multiple access techniques could be used—alone or in combination—to enable several users to communicate with the serving network simultaneously. Throughout this description, reference will be made to Code Division Multiple Access (CDMA) systems. In contrast to Time Division Multiple Access (TDMA) systems and Frequency Division Multiple Access (FDMA) systems, where users are separated in time and frequency, respectively, all active users in a CDMA system typically share time and frequency resources. To separate the users in a CDMA system, each user employs a specific code (often referred to as a spreading code) that distinguishes that particular user from the other users.

There exist two different principles regarding how to apply the user specific code in CDMA. In Frequency Hopping-CDMA (FH-CDMA), the code is used to define a sequence of frequencies. These frequencies are sequentially used for transmission, each frequency being applied a relatively short period of time. In Direct Sequence-CDMA (DS-CDMA) the signal to be transmitted is multiplied by the spreading code before transmission. Both FH-CDMA and DS-CDMA are well known in the art.

In a DS-CDMA system, a spreading code can be built up in several steps, e.g. by first applying a user specific code that is orthogonal to all other user specific codes used by that base station, and then applying a base station specific pseudo-noise sequence which accomplishes a frequency spreading of the signal. The symbols that constitute the spreading code (typically +/−1) are usually referred to as chips.

One particular example of a CDMA system is Wideband CDMA (WCDMA). WCDMA is used in Universal Mobile Telecommunications System (UMTS), which is advocated by the $3^{rd}$ Generation Partnership Project (3GPP). Without loss of generality, notations from UMTS/WCDMA will be used in this description. In UMTS, a base station is often referred to as Node B, and a wireless terminal is referred to as a User Equipment (UE).

Examples will also be presented by referring to logical and physical channels as specified in WCDMA, such as the Dedicated Control CHannel (DCCH) which is a logical channel used to transmit user specific control signalling and which is mapped onto the Dedicated Physical Data CHannel (DPDCH); the Dedicated Physical Control CHannel (DPCCH) which is a physical channel comprising e.g. Transmit Power Control (TPC) symbols, Transport Format Combination Indicator (TFCI) bits, etc; the Dedicated Physical CHannel (DPCH) which is a user specific physical channel intended for traffic data transmission; the Broadcast CHannel (BCH) which is a physical channel used to broadcast information intended for all users; and the Common Pilot CHannel (CPICH) which is a physical channel used to transmit pilot signals that can be used for e.g. channel estimation since these pilot signals are common for, and known by, all entities in the system.

Other channels that will be referred to are defined in connection to High Speed Downlink Packet Access (HSDPA), which is one of the services available in UMTS. Examples of HSDPA channels are the High Speed-Physical Downlink Shared CHannel (HS-PDSCH) which is a physical channel used to transmit high speed DL packet data, and the High Speed-Shared Control CHannel (HS-SCCH) which is a physical channel used for DL control signalling. The UE uses the information on the HS-SCCH to determine whether data packets transmitted on the HS-PDSCH are intended for that particular UE.

All references and notations from WCDMA are merely examples, meant to make this description more illustrative, and should by no means be construed as limiting or restrictive. On the contrary, this invention—as defined by the appended claims—can be practised in various other ways and can be applied to other standards than WCDMA, as can be understood by a skilled person.

The developments within the field of wireless communication have resulted in the evolution of increasingly advanced receivers. One of the benefits of such advanced receivers might be that they can offer better receiver performance than less advanced receivers. Comparing an advanced receiver with a less advanced receiver, this better receiver performance could, for example, manifest itself as a lower decoding error probability for the advanced receiver when both receivers experience the same received signal quality. Looking at it from another perspective: if both receivers are to have the same decoding error probability, the advanced receiver accomplishes that while experiencing worse received signal quality than the less advanced receiver.

One might use e.g. the signal-to-interference ratio (SIR) as a measure of the quality of a received signal, and e.g. bit error rate (BER) or block error rate (BLER) as a measure of the quality of the demodulated symbols after processing by a receiver. If, for example, the SIR of a signal received at a wireless terminal is decreased, the BER of the demodulated symbols after processing by an advanced receiver is still similar to, or better than, if the SIR of the received signal was not decreased and a less advanced receiver was used.

Consequently, the required quality of the received signal can be decreased for wireless terminals using advanced receivers. This might improve system capacity e.g. by allowing reduction of the transmission power used at the base station for transmissions to the wireless terminal. The same is true for the reversed situation; when a base station uses an advanced receiver, the wireless terminals transmitting to that base station could lower their transmission power.

Examples of advanced receivers are: an interference-cancelling receiver, such as a CPICH interference-cancelling receiver; a generalized RAKE (G-RAKE) receiver as described in for example EP 1197007 B1; variants of a G-RAKE receiver; and a chip equalizer.

Typically, advanced receivers experience longer processing time for steps performed by the receiver than a relatively less advanced receiver, such as a conventional RAKE receiver, does. For example, a G-RAKE receiver generates combining weights based on channel estimates and on an estimated interference correlation matrix. In particular the generation of the interference correlation matrix requires quite a large amount of baseband processing, which is performed for example in a digital signal processor (DSP). This results in a prolonged processing time compared to the processing time of a conventional RAKE receiver, since the RAKE receiver does not generate the estimated interference correlation matrix. Thus, in this context, an advanced receiver could be seen as a receiver having better performance quality, but longer processing time than a less advanced receiver.

This extra processing time might not pose any problems to the timing requirements of most portions of the signalling, such as e.g. the traffic information data symbols of the DPCH. For such portions of the signalling, symbols can be stored in a memory until the baseband processing of the advanced receiver, such as for example the calculation of the interference correlation matrix and the combining weights for a G-RAKE receiver, have been completed.

However, there might be certain portions of the signalling that cannot apply an advanced receiver because the delay due to the extra processing time is not acceptable. For example, the demodulation of certain portions of the signalling might have to answer to tighter real time requirements to be able to comply with a wireless communication standard such as the 3GPP standard. If an advanced receiver was applied to those certain portions of the signalling, the receiver might not be able to produce the demodulated symbols during a time frame that corresponds to the timing requirements. Examples of such certain portions of the signalling are the transmit power control (TPC) commands, the feedback information (FBI) commands, and the HS-SCCH as defined in the 3GPP standard.

For simplicity of notation, those certain portions of the signalling that are processed by the less advanced receiver will be referred to herein as time critical control signals (TCCS), and the signalling that does apply an advanced receiver will be referred to as non-TCCS. In the examples described above, the reason for using the less advanced receiver for the TCCS is that the TCCS cannot apply an advanced receiver because the delay due to the extra processing time is not acceptable. It should be understood though, that the invention is applicable to any situations where an advanced receiver is used to process a first portion of the received signal, and a less advanced receiver is used to process a second portion of the received signal. The reason for using the less advanced receiver for part of the processing is not necessarily that the delay due to the extra processing time of the advanced receiver is not acceptable.

TPC commands are used to control transmission power in both UL and DL of WCDMA systems. For power control of the UL, the base station evaluates the quality of the signals it receives from each UE compared to the quality requirements as defined in the WCDMA standard. Based on the evaluation, the base station determines whether a better or worse quality of the received signal is desired for each UE. A TPC command indicative of the desired change in quality is transmitted to each UE, which may or may not adjust its transmission power accordingly. A similar scenario exists for power control of the DL, where each UE evaluates the quality of the signal it receives from the base station compared to the quality requirements as defined in the WCDMA standard. Based on the evaluation, each UE determines whether a better or worse quality of the received signal is desired. A TPC command indicative of the desired change in quality is transmitted to the base station, which may or may not adjust its transmission power to that particular UE accordingly.

The evaluation and determination described above is often performed by a two-step control algorithm. A fast inner control loop, with e.g. a reference SIR value and an estimated actual SIR value as inputs, is used to control the TPC command. A slower outer control loop, with e.g. a reference BLER value and an estimated actual BLER value as inputs, controls the reference SIR value. The control mechanisms could comprise any control algorithms known in the art, such as a PD- or PID-regulator. For example, the inner control loop could comprise determining whether the estimated actual SIR value is greater than the reference SIR value or not. Usually, the TPC command comprises an "up"-instruction if the estimated actual SIR value is too low compared to the reference SIR value, and a "down"-instruction if the estimated actual SIR value is too high compared to the reference SIR value.

FBI commands are used in systems that apply transmit antenna diversity, i.e. when a transmitter employs several antennas to transmit the same message. The diversity is obtained by using, among other things, different phases for transmissions from the two antennas. The receiver can then benefit from this diversity, resulting in a diversity gain, i.e. better performance. A condition for obtaining the diversity gain is that the receiver is aware of the phase difference applied by the transmitter. This could be achieved, for example, by letting the receiver instruct the transmitter about what phase difference to use. This is done in WCDMA closed loop mode 1 and 2 transmission diversity, where Node B comprises at least two antennas and the UE transmits FBI commands on the UL to instruct Node B about the desired phase difference.

Since the UE evaluates the phase difference of the signals after channel propagation, it may instruct the base station to use a phase difference that gives the largest diversity gain at the receiver. This is beneficial since the propagation channel may alter the phase difference of the signals from the diversity antennas. Hence the phase difference that is believed to render the largest diversity gain, if determined without knowledge about the propagation channel, might not be equal to the phase difference that actually renders the largest diversity gain.

The description now returns to why TCCS cannot apply an advanced receiver and exemplifies with TPC commands transmitted in the DL to control the UL. Those TPC commands need to be decoded promptly so that the UE can be able to adjust the UL power according to the timing requirements in the 3GPP standard. In the 3GPP standard (Appendix B of 3GPP TS 25.214) it is required that the UE responds to the TPC command by adjusting the UL power within 512 chips from the reception of the TPC command. This means that the time available for processing the TPC command is 512 chips minus the maximum delay spread of the channel, which typically equals 80-100 chips. Similar timing requirements exist for TPC commands transmitted in the UL to control the DL. For FBI commands there is no strict timing requirement in the 3GPP specification. However, Node B needs to adjust to the FBI commands as soon as possible for the system to work properly. Hence, advanced receivers, such as a G-RAKE receiver, cannot be used for the processing of TCCS, such as the TPC or FBI commands. Therefore, receivers comprising an advanced receiver typically have to use a less advanced receiver, such as a RAKE receiver, for the reception of TCCS.

If, for example, a UE with an advanced receiver was employed in a WCDMA system as it is designed today, it would be seen that the improved reception performance of the advanced receiver would lower the power of the DL to a level where the required quality of the demodulated symbols, e.g. required BLER, was still achieved. The performance gain of advanced receivers, i.e. how much the DL power can be reduced compared to if a less advanced receiver was used while still obtaining the same receiver performance, can be in the order of several dB.

However, since the TCCS cannot be processed by the advanced receiver, as explained above, the improved performance is not available for the TCCS. Hence, since the power of the DL is lowered, this will lead to a deteriorated quality of the processed TCCS. For example, for TPC commands the error rate might increase from 5% to 15-40% due to the decreased DL power. Such an increase of the TPC command decoding error rate will potentially destabilize the power control loops. If a majority of the transmitted TPC commands constitute a "down"-instruction and the receiver experiences a high TPC command decoding error rate, then an unnecessarily high UL power consumption results. If, even worse, a majority of the transmitted TPC commands constitute an "up"-instruction and the receiver experiences a high TPC command decoding error rate, then Node B could loose the synchronization with the UE and a dropped call could result.

The simulation results shown in FIG. 1 illustrate possible consequences of the deteriorated TPC decoding in a receiver comprising an advanced receiver. A channel case 1 where the channel consists of 2 taps, as defined in the 3GPP standard ("UE radio transmission and reception (FDD)", 3GPP TS 25.101) has been assumed, and $\hat{I}_{or}/I_{oc}$ has been varied. $\hat{I}_{or}$ for is the total power spectral density of the DL transmitted from Node B as seen at the UE antenna connector, and $I_{oc}$ is the power spectral density as measured at the UE antenna of a band limited white noise source, which is meant to simulate interference from cells which are not defined in a test procedure. Hence, $\hat{I}_{or}/I_{oc}$ represents a SIR value. UL and DL inner as well as outer power control were used in the simulations. Three different receivers have been examined: a conventional RAKE with 2 fingers (*), a G-RAKE with 2+2 fingers and one receiver antenna denoted G-RAKE 1 (+), and a G-RAKE with (2+2)*2 fingers and two receiver antennas denoted G-RAKE 2 (Δ). In the G-RAKE 2 case, the correlation between the antennas is assumed to be 0.7 and the gain for antenna 2 is −10 dB compared to antenna 1. A standard RAKE receiver is used for the TPC detection in all three cases. Furthermore, speech service with slot format 8 was assumed (spreading factor 128, 2 pilot symbols and 1 TPC symbol, as defined in 3GPP TS 25.211). The resulting average DL code power (i.e. $E_c/\hat{I}_{or}$, the ratio of the average transmit energy per chip $E_c$ to the total transmit power spectral density $\hat{I}_{or}$) denoted by dashed lines, as well as the average UL output power denoted by unbroken lines can be found in FIG. 1 as functions of $\hat{I}_{or}/I_{oc}$.

In the simulation results, an increase in the needed UL power due to a higher decoding error rate for the TPC commands can be clearly seen. A larger DL gain leads to a larger UL loss due to bad TPC detection performance. As mentioned above, this is due to the fact that the better the DPCH decoding is; the lower the received DL SIR needs to be. This in turn increases the TPC decoding error rate because the conventional RAKE detector, which is used for the TPC commands, now operates on a too low SIR, giving TPC decoding error rates of 15-40% (instead of 5%, which is a typical value appropriate for fulfilling the requirements in the standard).

As can be seen in FIG. 1 the average DL power reduction is large in the G-RAKE 1 case (for high $\hat{I}_{or}/I_{oc}$) and very large in the G-RAKE 2 case (for all $\hat{I}_{or}/I_{oc}$) compared to the RAKE case. However, the larger the gain is, in terms of DL power reduction, the larger the average loss of UL power becomes, as can be seen in FIG. 1, due to that erroneous TPC decoding increases the UL power variations. This could force Node B to increase its SIR reference value, and hence transmitting an excessive amount of "up"-instructions in order to maintain an acceptable quality of service. The result is decreased UL capacity. There is also a risk for dropped calls as described above, but not apparent from FIG. 1.

Similar situations may arise when the UL power is reduced due to that Node B employs an advanced receiver. For example, TPC commands are also employed to control transmission power of the DL as mentioned above, and problems very similar to those described above in connection to UL power control, may occur for DL power control. Another example of problems arising due to UL power reduction is provided when studying the FBI commands. As mentioned before, an advanced receiver is not feasible to use for the FBI commands due to timing requirements. Consequently, the detection of the FBI commands will suffer from a higher error rate if the UL power is reduced due to that Node B employs an advanced receiver. This in turn could result in that Node B applies an erroneous phase difference for the transmission from the diversity antennas. Hence, the diversity gain could be lost, which decreases the DL capacity of the system. The performance might even be worse than the performance of a system not employing transmit diversity at all.

In a UE adapted for HSDPA, the HS-PDSCH could with advantage be processed using an advanced receiver. However, the advanced receiver might not be applicable to the processing of the HS-SCCH, e.g. due to timing requirements. The HS-SCCH must be processed within a certain timeframe, otherwise the UE risks missing the data packets on the HS-PDSCH that were intended for that UE. Hence, a scenario similar to the ones described above arises. The power used to transmit the HS-PDSCH could be lowered since the HS-PDSCH is processed by an advanced receiver. This in turn deteriorates the quality of the determinations made based on HS-SCCH, since the HS-SCCH is not processed using the advanced receiver.

To conclude, wireless receivers that comprise an advanced receiver might experience a deteriorated error performance for the TCCS, for which the advanced receiver is not used. Therefore, there is a need for systems, methods and devices that obtain acceptable receiver performance quality of all portions of the received signal for each individual transceiver that comprises at least two receivers, and where the at least two receivers are used to process different portions of the received signal.

In the 3GPP specification TS 25.214 "Physical Layer Procedures (FDD)" it is disclosed that the network can set a power offset (PO2) to be applied to the TPC command portion of the signalling. This power offset will be applied equally to all UEs in the network irrespective of their individual needs.

In WO 02/23764 A2 the energy at which a transmit power control is transmitted is set based on how important it is that the transmit power control command is received. As an indication of how important it is that the transmit power control command is received, a difference between a measured quality, e.g., SIR, of a received signal and a reference may be determined.

In HSDPA Channel Quality Index (CQI) values are reported in the UL at regular time intervals. The reported CQI value is based on the SIR experienced by the receiver used to process HS-PDSCH in the UE. Based on the received CQI reports, Node B determines what power, code rate, and symbol alphabet to use for transmissions on the HS-PDSCH. Based on the CQI reports and different assumptions, Node B can also determine a power offset to be used for transmission of the HS-SCCH. That is, the HS-SCCH could be transmitted using a higher transmission power than the HS-PDSCH as determined by the power offset.

SUMMARY

Embodiments of the invention provide methods and devices for adjustment of transmission parameters, so that acceptable performance can be obtained in a transceiver for all portions of the received signal of a physical channel when the transceiver comprises at least two receivers, and where the at least two receivers are used to process different portions of the received signal of the physical channel.

In one embodiment of the invention a method for controlling transmission parameters in a wireless communication system, in which a first portion and a second portion of signals are transmitted on a physical channel to a first transceiver from a second transceiver is provided. A first receiver processing algorithm is used in the first transceiver to process the first portion of signals received on the physical channel and a second receiver processing algorithm is used in the first transceiver to process the second portion of signals received on the physical channel. The method comprises the steps of: transmitting an indication indicating that the first and the second receiver processing algorithms are used in the first transceiver to process the first and second portions, respectively, of signals received on the physical channel; receiving the indication at the second transceiver; and adjusting, at the second transceiver in response to the indication, a transmission parameter for at least one of the first and second portions of signals to be transmitted on the physical channel to the first transceiver.

In an alternative embodiment, a method of receiving a first portion and a second portion of signals transmitted on a physical channel of a wireless communication system is provided. A first receiver processing algorithm is used to process the first portion of signals received on the physical channel and a second receiver processing algorithm is used to process the second portion of signals received on the physical channel. The method comprises the step of transmitting an indication indicating that the first and the second receiver processing algorithms are used to process the first and second portions, respectively, of signals received on the physical channel.

In another alternative embodiment, a method of transmitting a first portion and a second portion of signals on a physical channel from a transceiver to each of a number of remote transceivers in a wireless communication system is provided. The method comprises the steps of: transmitting signals on the physical channels; receiving control signalling from the remote transceivers; adjusting, if control signalling received from a specific remote transceiver comprises an indication indicating that said specific remote transceiver uses a first receiver processing algorithm to process the first portion of signals received on the physical channel and a second receiver processing algorithm to process the second portion of signals received on the physical channel, a transmission parameter for at least one of the first and second portion of signals to be transmitted on the physical channel to that specific remote transceiver, in dependence of said indication. In this embodiment the indication might be received from the specific remote transceiver. Alternatively, if the control signalling is free from the indication, the indication may be determined in the transceiver based on evaluations of the control signalling received from the specific remote transceiver.

In particular, the indication may comprise the information that the first and the second receiver processing algorithms are used in the first transceiver to process the first and second portions, respectively, of signals received on the physical channel.

Alternatively, the indication may indicate a performance difference between the first portion of signals received on the physical channel and the second portion of signals received on the physical channel. The performance difference may for example be a signal-to-interference ratio (SIR) difference.

As yet an alternative, some of the methods above may further comprise the steps of evaluating the second portion of signals received on the physical channel; and determining the indication based on the evaluation. The indication may indicate a desired power offset to be applied to the second portion of signals to be transmitted on the physical channel.

In some embodiments, the step of adjusting the transmission parameter comprises one or more of applying a power offset to the second portion of the signals of the physical channel or changing an encoding scheme applied to the second portion of the signals of the physical channel or changing a slot format.

In the embodiments, the indication may be transmitted in connection with: a power on signalling, or a connection set up, or when a service is requested or handover control signalling, or when the first transceiver instructs the second transceiver to decrease the transmission power for the first portion of the signals to be transmitted on the physical channel, or when the first transceiver detects that a quality value of the second portion of the signals of the physical channel falls below a threshold.

In these embodiments the first receiver processing algorithm may be one of a G-RAKE receiver processing algorithm, an interference-cancelling receiver processing algorithm, and a chip equalizer processing algorithm and the second receiver processing algorithm may be a RAKE receiver processing algorithm.

The invention also relates to a computer program and a computer-readable medium with program code embodied thereon, which, when run by a computer processor, performs method steps of embodiments of the invention as described above.

Embodiments of the invention further relate to a wireless communication system comprising a first transceiver for receiving a first portion and a second portion of signals transmitted on a physical channel and a second transceiver for transmitting the first portion and the second portion of signals on the physical channel to the first transceiver. The first transceiver comprises a first receiver adapted to process the first portion of signals received on the physical channel and a second receiver adapted to process the second portion of signals received on the physical channel. The first transceiver further comprises a transmitter adapted to transmit an indication indicating that the first transceiver uses the first receiver to process the first portion of signals received on the physical channel and the second receiver to process the second portion of signals received on the physical channel. The second transceiver comprises a transmitter adapted to transmit signals on the physical channel and a receiver adapted to receive the indication from the first transceiver. The second transceiver further comprises a controller adapted to adjust a transmission parameter for at least one of the first and second portions of the signals to be transmitted on the physical channel to the first transceiver in dependence of said indication.

Other embodiments of the invention relate to a transceiver for receiving a first portion and a second portion of signals transmitted on a physical channel in a wireless communication system. The transceiver comprises a first receiver adapted to process the first portion of signals received on the physical channel and a second receiver adapted to process the second portion of signals received on the physical channel. The transceiver further comprises a transmitter adapted to transmit an indication indicating that the transceiver uses the first receiver to process the first portion of signals received on the physical channel and the second receiver to process the second portion of signals received on the physical channel.

In particular, the indication may comprise the information that the first and the second receivers are used in the first transceiver to process the first and second portions, respectively, of signals received on the physical channel.

The transceiver may further be adapted to determine a performance difference (for example a SIR difference) between the first and second portions of signals received on the physical channel, and to determine the indication based on the performance difference. The transceiver may comprise means (e.g. a channel estimation and signal-to-noise ratio estimation unit and a control unit) adapted to produce the indication. The transceiver may further be adapted to evaluate the second portion of signals received on the physical channel; and to determine the indication based on the evaluation. The indication may indicate a desired power offset to be applied to the second portion of signals of the physical channel.

The first receiver may be one of a G-RAKE receiver, an interference-cancelling receiver, and a chip equalizer and the second receiver may be a RAKE receiver.

Yet other embodiments of the invention relate to a transceiver for transmitting a first portion and a second portion of signals on a physical channel to each of a number of remote transceivers in a wireless communication system, the transceiver comprising: a transmitter adapted to transmit signals on the physical channels and a receiver adapted to receive control signalling from the remote transceivers. The transceiver further comprises a controller adapted to adjust, if control signalling received from a specific remote transceiver comprises an indication indicating that said specific remote transceiver uses a first receiver to process the first portion of signals received on the physical channel and a second receiver to process the second portion of signals received on the physical channel, a transmission parameter for at least one of the first and second portions of the signals to be transmitted on the physical channel to that specific remote transceiver in dependence of said indication. In some of these embodiments the transceiver may comprise a control unit adapted to evaluate the control signaling received from the specific remote transceiver, if the control signaling is free from the indication; and means adapted to determine the indication based on the evaluation. The controller adapted to adjust a transmission parameter may further be adapted to perform one or more of: applying a power offset to the second portion of the signals to be transmitted on the physical channel or changing an encoding scheme applied to the second portion of the signals to be transmitted on the physical channel or changing a slot format.

In particular, the indication may comprise the information that the first and the second receivers are used in the first transceiver to process the first and second portions, respectively, of signals received on the physical channel.

Alternatively, the indication may indicate a performance difference (such as a SIR difference) between the first portion of signals on the physical channel and the second portion of signals of the physical channel. The controller is then adapted to adjust the transmission parameter in dependence of the performance difference.

In each of the embodiments above, the indication may indicate a desired transmission parameter adjustment.

A transceiver according to the embodiments of the invention may reside within base stations and/or wireless terminals in the wireless communication system and furthermore, it may be a WCDMA transceiver. A transceiver according to the embodiments may comprise one or more receive antennas, and one or more transmit antennas.

The wireless communication system may be a WCDMA system and the physical channel may be a Dedicated Physical Channel, DPCH, or a High Speed Synchronisation Control Channel, HS-SCCH. The second portion of the signals of the physical channel may comprise one or more of transmit power control, TPC, commands, or high speed synchronisation control channel, HS-SCCH, signalling, or feedback information, FBI, commands.

BRIEF DESCRIPTION OF THE DRAWINGS

The invention will now be described more fully below with reference to the drawings, in which.

DETAILED DESCRIPTION

As explained above, receivers comprising an advanced receiver typically have to use a less advanced receiver for the reception of TCCS (e.g. TPC commands, the FBI commands, and HS-SCCH), for example due to timing requirements. The advanced receiver may increase the capacity by e.g. allowing a lower transmission power for signals intended for the receivers comprising an advanced receiver. However, a lowered transmission power results in a deterioration of the detection quality of the TCCS because the advanced receiver cannot be used for the processing of the TCCS.

In the following, several embodiments of the invention will be described. For simplicity, the description is focused on WCDMA systems and on transceivers in such systems comprising a conventional RAKE receiver and a G-RAKE receiver. The TCCS is represented by TPC commands, FBI commands, and HS-SCCH in the described embodiments. However, this should not be construed to mean that the invention is limited to those cases. On the contrary, the invention is defined by the appended claims.

Figure 1:
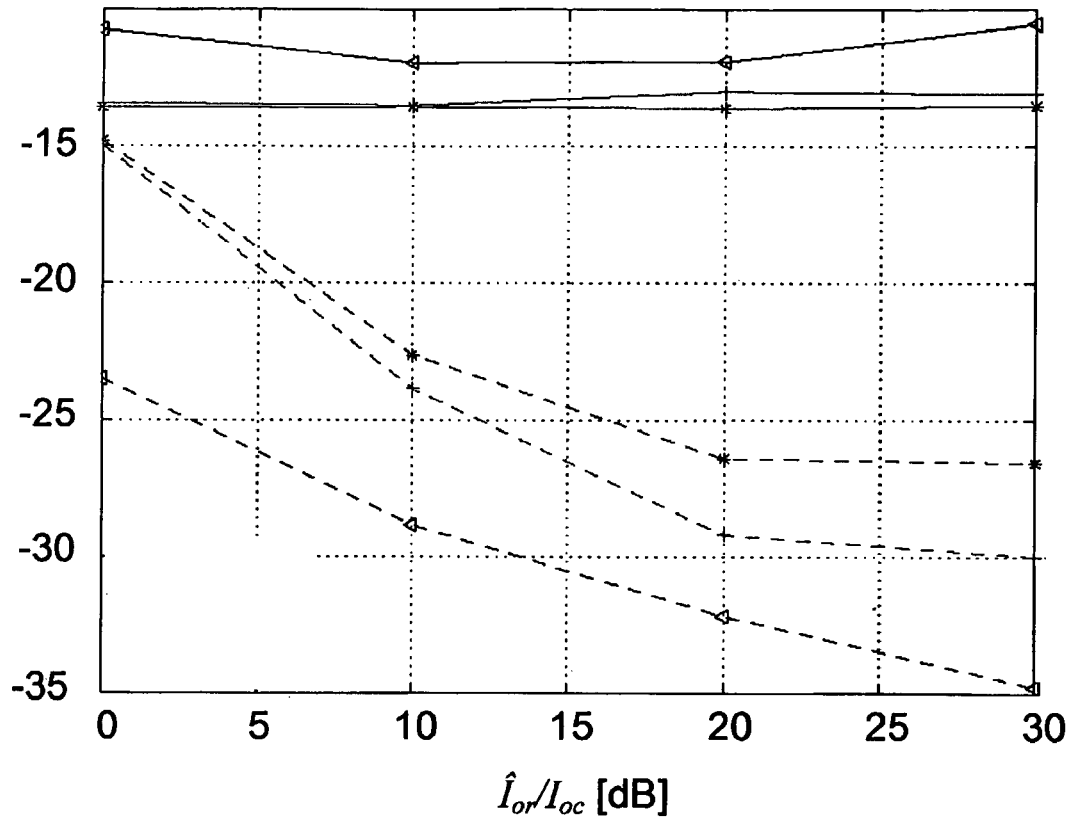
FIG. 1 (previously described) illustrates an increase in the needed UL power due to decreased DL power, when a G-RAKE receiver is used to process information data and a conventional RAKE receiver is used to process the TPC commands.
Figure 2:
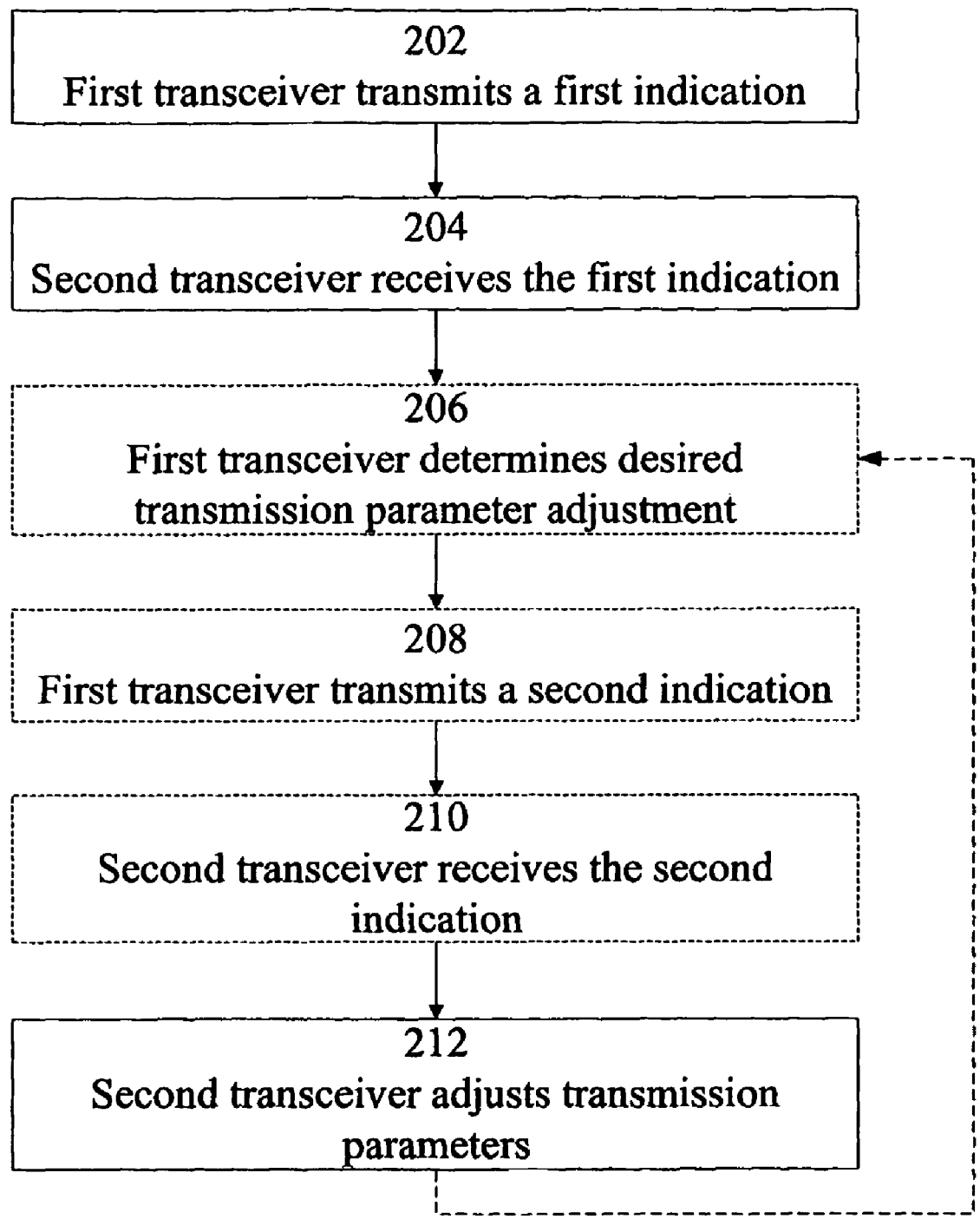
FIG. 2 is a schematic flowchart illustrating a first embodiment of the invention as carried out in a communication system.

FIG. 2, is a flowchart illustrating one embodiment of the invention as carried out in a communication system. According to this embodiment, a first transceiver transmits a first indication 202 comprising information that the first transceiver uses an advanced receiver for non-TCCS, but that the advanced receiver is not used for TCCS. The advanced receiver could be a G-RAKE receiver, and a conventional RAKE receiver could be used for the TCCS. The first indication 202 could also comprise information defining TCCS, i.e. that the advanced receiver is not used for TPC commands, FBI commands, the HS-SCCH, and/or any other signalling that e.g. has to comply with time critical reception conditions. As explained above, using a less advanced receiver for the TCCS typically means a deterioration of the detection quality, e.g. a higher error probability, of the TCCS provided that the TCCS is received with the same quality of the received signal, e.g. SIR, as the non-TCCS.

Referring to FIG. 2, the first indication is then received by a second transceiver 204, which in turn adjusts one or more of its transmission parameters 212 to improve the detection quality of the TCCS. This adjustment of at least one transmission parameter could comprise for example increasing the transmission power during transmission of the TCCS, changing the slot format of the transmission so that more bits are used for the TCCS, or applying an alternative encoding scheme to the TCCS.

If the adjustment of at least one transmission parameter comprises increasing the transmission power during transmission of the TCCS, the desired transmission power can be determined for example by determining the absolute level of power needed, by determining a power offset needed, by determining whether it is desired to increase or decrease the power, or by determining which of a plurality of predetermined power offset values should be used.

If the adjustment of at least one transmission parameter comprises changing the slot format, any possible slot formats in use in the particular system under consideration might be considered. For example, in UMTS there exist slot formats in which the TPC command occupies 1, 2, 4, 8 or 16 bits, and the FBI command occupies 1 or 2 bits.

If the adjustment of at least one transmission parameter comprises changing the encoding scheme, one might consider repetition coding as is employed in today's UMTS systems. However, any encoding scheme allowable in the system in question might be considered.

The determination regarding what transmission parameter adjustment is preferred can be made at either of the first and second transceivers.

If the determination regarding the desired adjustment of at least one transmission parameter is made at the first transceiver some information about the determination must be transmitted to the second transceiver, so that the second transceiver can base its transmission parameter adjustment on the determination. Reverting now to FIG. 2, the first transceiver makes a determination regarding what the desired transmission parameter adjustment would be 206, e.g. how much extra power it needs to be able to process the TCCS with acceptable/required detection quality. This determination could for example be made based on estimated reception quality of already received DL transmissions.

Then the first transceiver transmits a second indication 208, which comprises information regarding the desired transmission parameter adjustment. The second indication is received by the second transceiver 210, and the second transceiver can use the information in the second indication for the transmission parameter adjustment 212.

Steps 206, 208, 210, and 212 can be carried out once, periodically, or repeatedly based on when predefined events occur. If these steps are carried out once, that could be e.g. when a connection is set up between the first and second transceiver. For example, if the first transceiver is a UE in an UMTS system, the second indication could be transmitted together with other UE specific parameters, such as UE identification, when connecting to the network. If the steps are carried out periodically according to some predetermined repetition interval, that could be e.g. at each measurement report. Finally, if the steps are carried out repeatedly on an event driven basis, the events that trigger the executions of the steps could be e.g. when a call is initiated, in handover situations, when the first transceiver detects that the error probability for the TCCS falls below a threshold, when a measurement report shows that the TCCS detection quality is deteriorated, or when the first transceiver instructs the second transceiver to lower its transmission power for the non-TCCS.

If the determination regarding the adjustment of at least one transmission parameter is made at the second transceiver, for example by evaluating signals—other than a second indication—received from the first transceiver, then steps 206, 208 and 210 of FIG. 2 are left out. Then the second transceiver bases its transmission parameter adjustment on the first indication and on the determination made at the second transceiver.

An alternative approach is that the second receiver performs a predetermined transmission parameter adjustment 212, e.g. adds a predetermined power offset to the TCCS (for example 3 dB), when the first indication is received 204 without either trying to determine a desired transmission parameter adjustment or receive a second indication comprising information regarding a determination made at the first transceiver.

In some embodiments of the invention, the first transceiver signals (once or periodically) how much power offset it needs, as mentioned above. In some of these embodiments the TCCS comprises TPC commands and the first transceiver is a UE. If the UE is aware beforehand (e.g. through design parameters) of how large the performance difference is between the advanced receiver and the less advanced receiver, it can signal this performance difference to the network without having to repeatedly estimate a desired transmission parameter adjustment. The network might then set or adjust an appropriate power offset based on the performance difference and apply the power offset to that particular UE.

In other embodiments the UE periodically evaluates the quality of the TPC commands, and, depending on the quality, instructs the network to increase or decrease the power offset (by communicating either a power offset up/down command, the actual desired power offset change, or a desired absolute power level). This closed loop approach can be good if the performance gain of the advanced receiver is depending on the propagation conditions and/or other time dependent variables, which is the case when the advanced receiver is a G-RAKE receiver.

In some embodiments, the determination regarding the adjustment of at least one transmission parameter is made at the second transceiver, and no indication, or only the first indication, is transmitted from the first transceiver to the second transceiver, as has been mentioned above. In some of those embodiments the first transceiver is a UE, the second transceiver is a Node B of a serving NW, the TCCS comprises TPC commands, and the NW should determine (in Node B or elsewhere) e.g. a desired power offset to be applied to the TPC commands for each specific UE. To accomplish this, the NW could, for example, compare the TPC commands it has transmitted to a specific UE, with how the UE reacts to those TPC commands. If the UE reaction is in line with the transmitted commands, i.e. if the UE has changed its transmission power as requested, the UE probably does not need power offset to the TPC commands. On the other hand, if the UE reaction appears random or is contrary to the transmitted TPC commands the UE probably needs power offset to the TPC commands.

This determination regarding power offset to the TPC commands for a particular UE could be made for example by setting a dummy value to 1 each time the UE acts contrary to a transmitted TPC command and to 0 when the reaction is in line with the transmitted TPC command. Then these dummy values could be filtered or otherwise averaged over time, and the result could be compared to one or more thresholds to determine if an adjustment of transmission parameters is needed for that UE and to determine, for example, the amount of power offset needed. In some embodiments a single threshold could be used to determine if the power offset should be set to zero or to a predetermined value, and in other embodiments several thresholds could be used to differentiate the power offset values.

In the embodiments described so far, a first and possibly a second indication may be transmitted in the form of a message from a first transceiver to a second transceiver. The first indication comprises information that the first transceiver uses an advanced receiver for non-TCCS, but that the advanced receiver is not used for TCCS. The second indication comprises information regarding the desired transmission parameter adjustment.

It should be understood, though, that other embodiments of the invention could employ only one indication, which could comprise only information that the first transceiver uses an advanced receiver for non-TCCS, but that the advanced receiver is not used for TCCS, only information regarding the desired transmission parameter adjustment, or a combination of these pieces of information. An indication could also comprise a definition of what portions of the signalling constitutes the TCCS and/or information regarding the performance difference between the advanced and the less advanced receivers.

Some embodiments of the invention might employ more than two indications. If, for example, the TCCS comprises both TPC commands and FBI commands, a first indication could comprise that information, a second indication could comprise a desired parameter adjustment for the TPC commands, and a third indication could comprise a desired parameter adjustment for the FBI commands.

Yet other embodiments exist where no indication is transmitted from the first transceiver to the second transceiver. In these embodiments, the second transceiver determines an indication of e.g. a desired transmission parameter adjustment, without receiving either of the first and second indication from the first transceiver.

These indications, in different combinations, could be sent once, periodically, or on an event-driven basis as has been explained above.

From the previous description it is apparent that the first transceiver could reside within a wireless terminal while the second transceiver resides within a serving network or vice versa. It should also be noted, however, that in some embodiments of the invention, the first and second transceivers are both wireless terminals communicating with each other without the control of a base station or a serving network.

Figure 3:
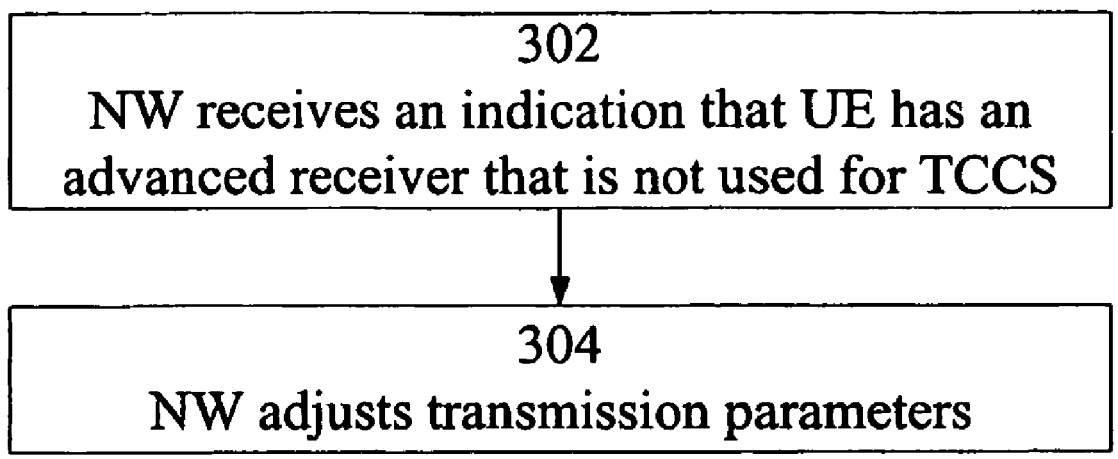
FIG. 3 is a schematic flowchart illustrating a second embodiment of the invention as carried out at the network side of a communication system.

FIG. 3 is a flowchart illustrating method steps that are carried out at the network side of a communication system according to some embodiments of the invention. In these embodiments, the NW receives (e.g. at a base station) an indication 302 that a UE has an advanced receiver that is not used for TCCS. Then the NW adjusts one or more transmission parameters of the TCCS 304.

In this embodiment, the determination regarding the desired transmission parameter adjustment could be made at the NW, for example by evaluating the signals received from the UE. An alternative approach is that the NW applies a predetermined transmission parameter adjustment (e.g. a 3 dB power offset) when the first indication is received, without trying to determine a desired transmission parameter adjustment.

Figure 4:
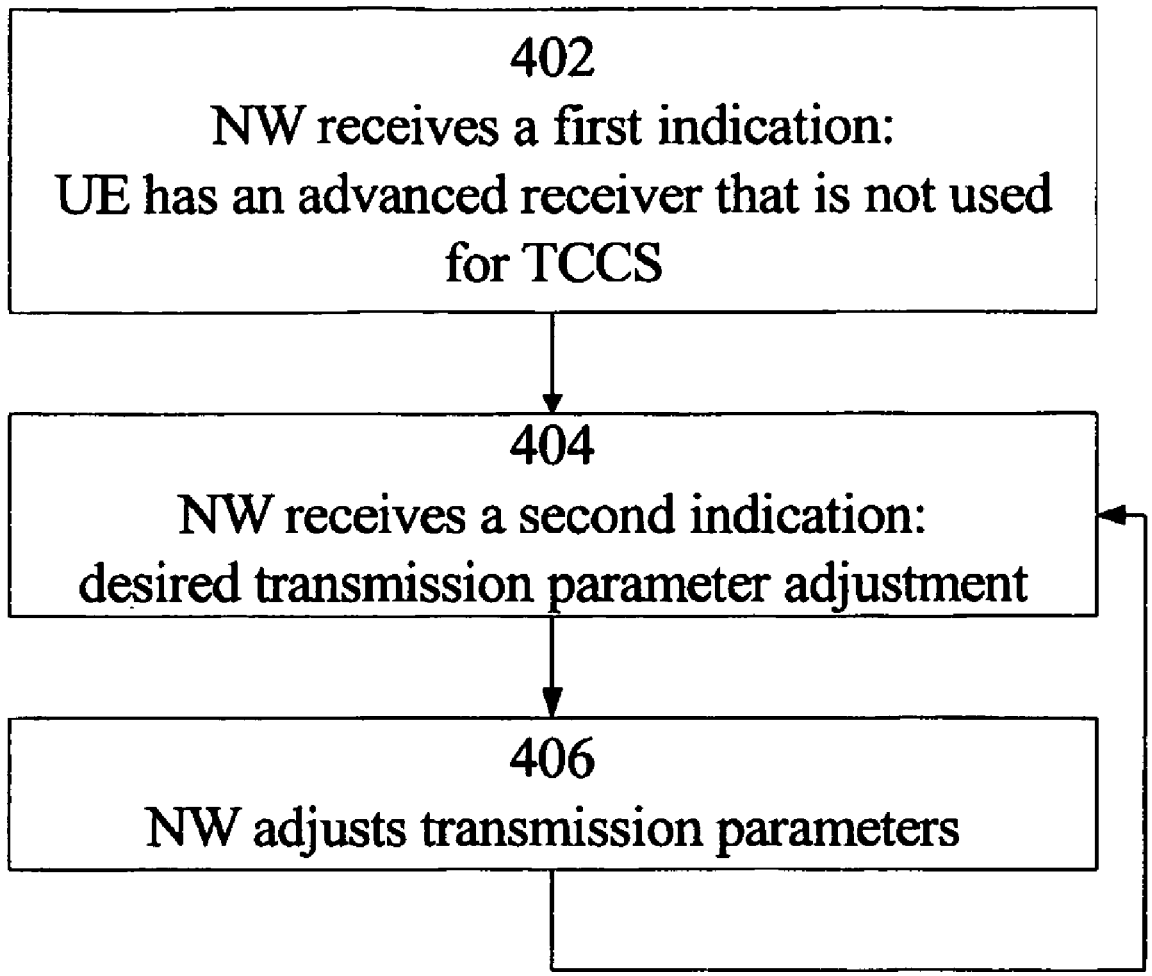
FIG. 4 is a schematic flowchart illustrating a third embodiment of the invention as carried out at the network side of a communication system.

FIG. 4 is a flowchart illustrating method steps that are carried out at the network side of a communication system according to some embodiments of the invention. In these embodiments, the NW receives (e.g. at a base station) a first indication 402 that a UE has an advanced receiver that is not used for TCCS. Then the NW receives a second indication 404 comprising information regarding the desired transmission parameter adjustment, and the NW adjusts one or more transmission parameters 406 at least in part based on the first and second indication. Method steps 404 and 406 may be performed repeatedly.

Figure 5:
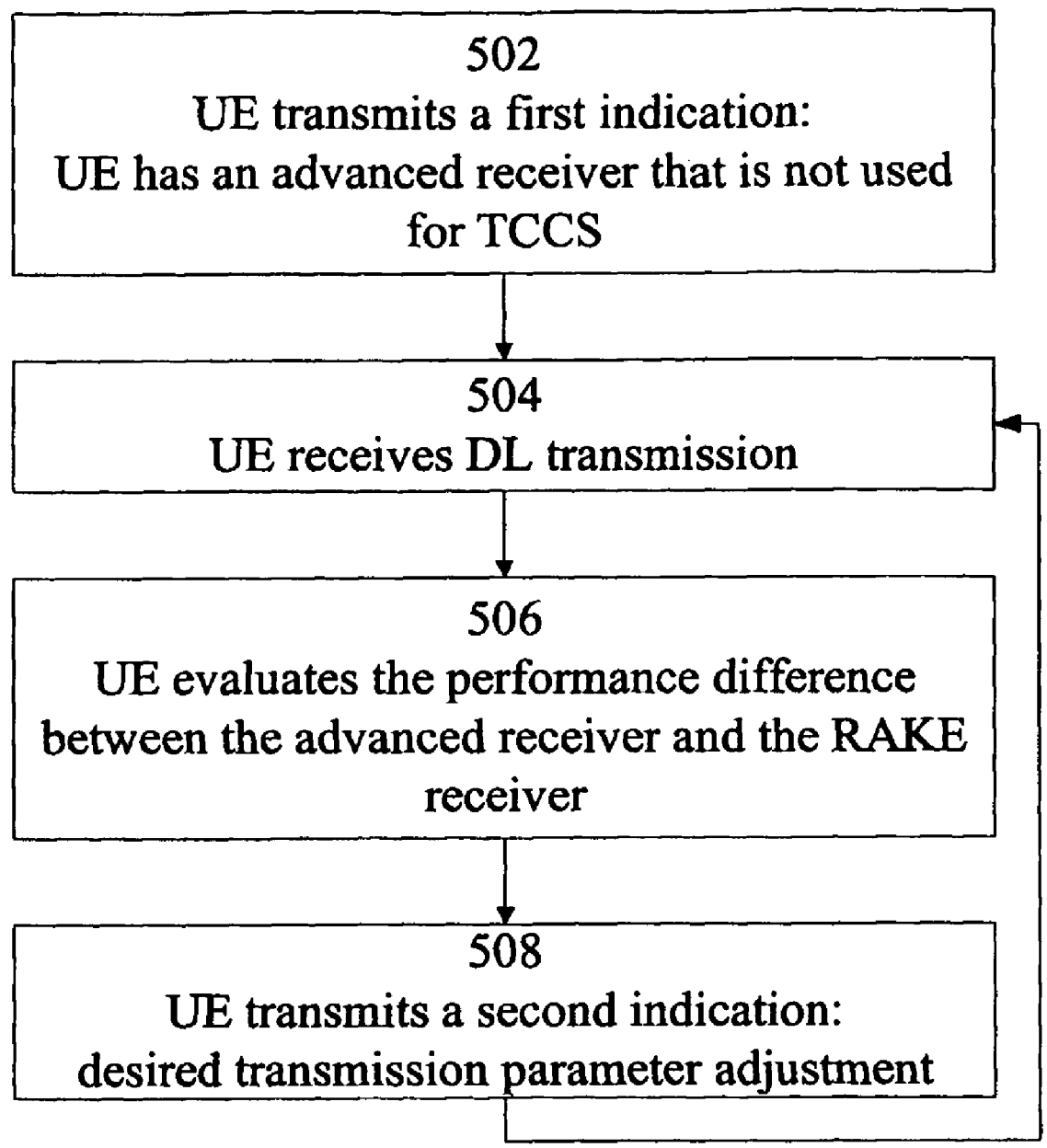
FIG. 5 is a schematic flowchart illustrating a fourth embodiment of the invention as carried out in a wireless terminal.

FIG. 5 is a flowchart illustrating method steps carried our by a wireless terminal (UE) according to further embodiments of the invention. In these embodiments, the UE transmits a first indication 502 that the UE has an advanced receiver that is not used for TCCS. The UE receives DL transmissions 504 e.g. from Node B of a serving NW. This reception goes on more or less continuously as specified in any of the wireless communication standards know in the art, e.g. the 3GPP specification. Based on the received DL transmissions, the UE evaluates the performance difference between the advanced receiver and the less advanced receiver (e.g. a RAKE receiver) 506. Then the UE transmits a second indication 508 comprising information regarding the desired transmission parameter adjustment, which is, at least in part, based on the evaluation of the performance difference. Method steps 504, 506 and 508 may be performed repeatedly.

Figure 6:
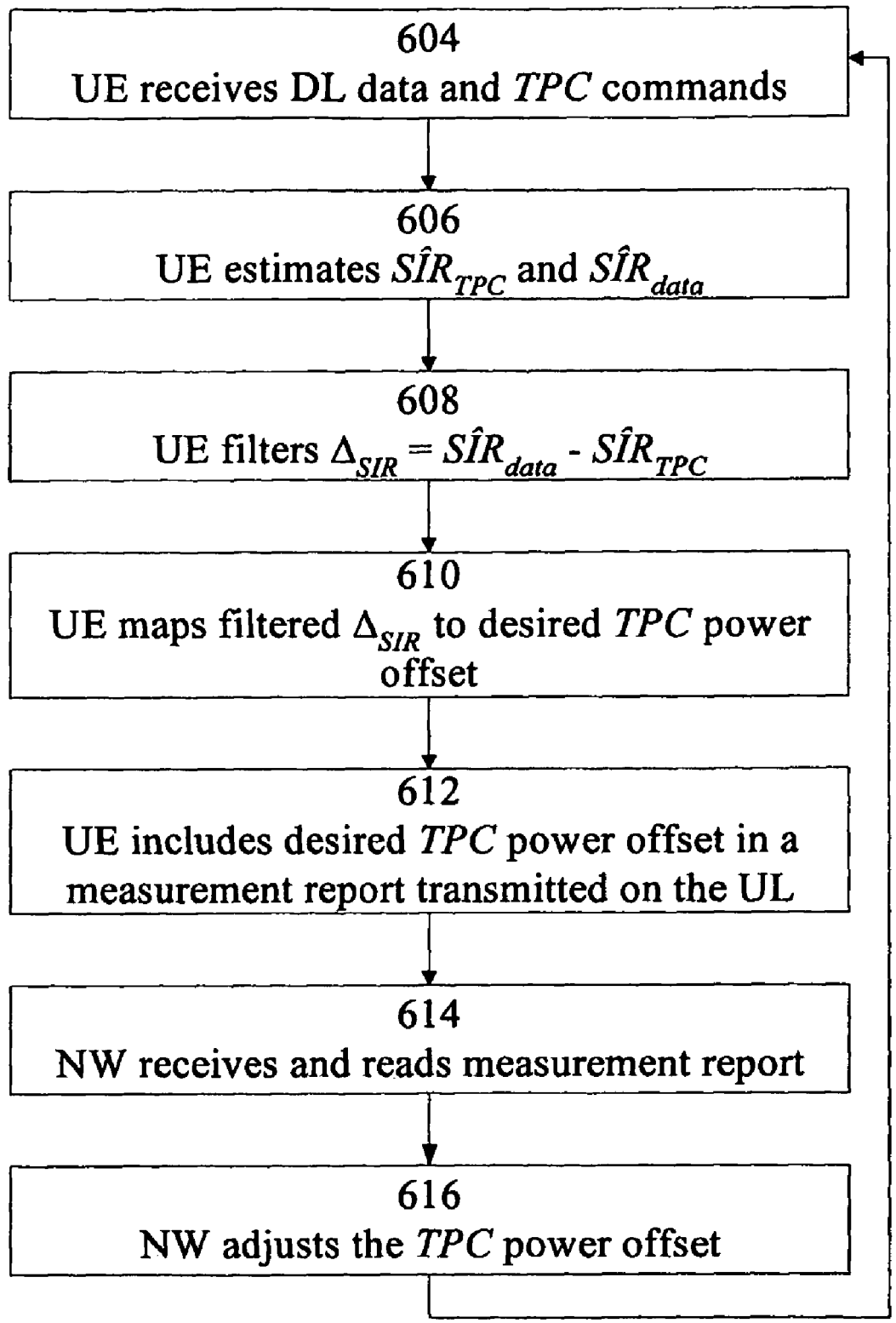
FIG. 6 is a schematic flowchart illustrating a fifth embodiment of the invention as carried out in a communication system.

FIG. 6 is a flowchart illustrating method steps carried out in a wireless communication system according to some embodiments of the invention. The figure describes a UE that determines the desired transmission parameter adjustment and transmits an indication thereof to a serving NW. In this embodiment, the transmission parameter adjustment is represented by a TPC power offset, but the described method is equally applicable to other situations.

In this embodiment, the UE receives DL data and TPC commands 604. In the UE, the DL data is processed by an advanced receiver, and the TPC commands are processed by a less advanced receiver. A performance quality value for each of the advanced and the less advanced receivers is estimated in the UE 606. Any appropriate quantity could be used for the performance quality value, for example estimated BER, BLER, SIR, etc. In this particular embodiment, estimated SIR is used. A SIR estimate is determined for each of the two receivers, the advanced receiver that is used to process the DL data ($\hat{SIR}_{data}$) and the less advanced receiver that is used to process the TPC commands ($\hat{SIR}_{TPC}$).

The difference, $\Delta_{SIR}$, between these two performance quality values could constitute a basis for determining the desired transmission parameter adjustment that should be requested from the NW. Optionally, the difference ASR could be filtered 608 to combat temporary fluctuations in the performance measures.

Then the filtered difference is used to determine a desired transmission parameter adjustment. This could for example be done by transmitting the filtered difference and letting the NW determine the desired transmission parameter adjustment based on the filtered difference, or it could be done by mapping the filtered difference to a desired transmission parameter adjustment such as a TPC power offset, a slot format, or an encoding scheme. The mapping could be performed for example by reading entries from a look-up table, or it could be calculated by application of a formula describing the mapping. The filtered difference could alternatively be compared to one or several thresholds to determine if and what type of transmission parameter adjustment is desired.

Then an indication of the desired transmission parameter adjustment is transmitted to the network. In this embodiment, the filtered $\Delta_{SIR}$ is mapped to a desired TPC power offset 610, and the desired TPC power offset is included in a measurement report 612. The measurement report could also include e.g. SIR measurements on neighbouring cells. Then, the network receives and reads the measurement report 614 and adjusts the TPC power offset accordingly 616. Method steps 604, 606, 608, 610, 612, 614 and 616 might be performed only once, but are typically repeated periodically or on an event driven basis.

The two SIR estimates could, for example, be calculated as $$\hat{SIR}_{data} = \underline{\hat{h}}^H \hat{R}^{-1} \underline{\hat{h}}, \quad (1)$$

and $$\hat{SIR}_{TPC} = \underline{\hat{h}}^H \hat{\Sigma}^{-1} \underline{\hat{h}}, \quad (2)$$

where $\underline{\hat{h}}$ is a vector denoting the channel estimation, $\underline{\hat{h}}^H$ is the Hermetian transpose of $\underline{\hat{h}}$, $\hat{R}^{-1}$ is the inverse of the estimated interference correlation matrix $\hat{R}$, and $\hat{\Sigma}^{-1}$ is the inverse of a diagonal matrix, $\hat{\Sigma}$, comprising noise estimates as is well known in the art.

Figure 7:
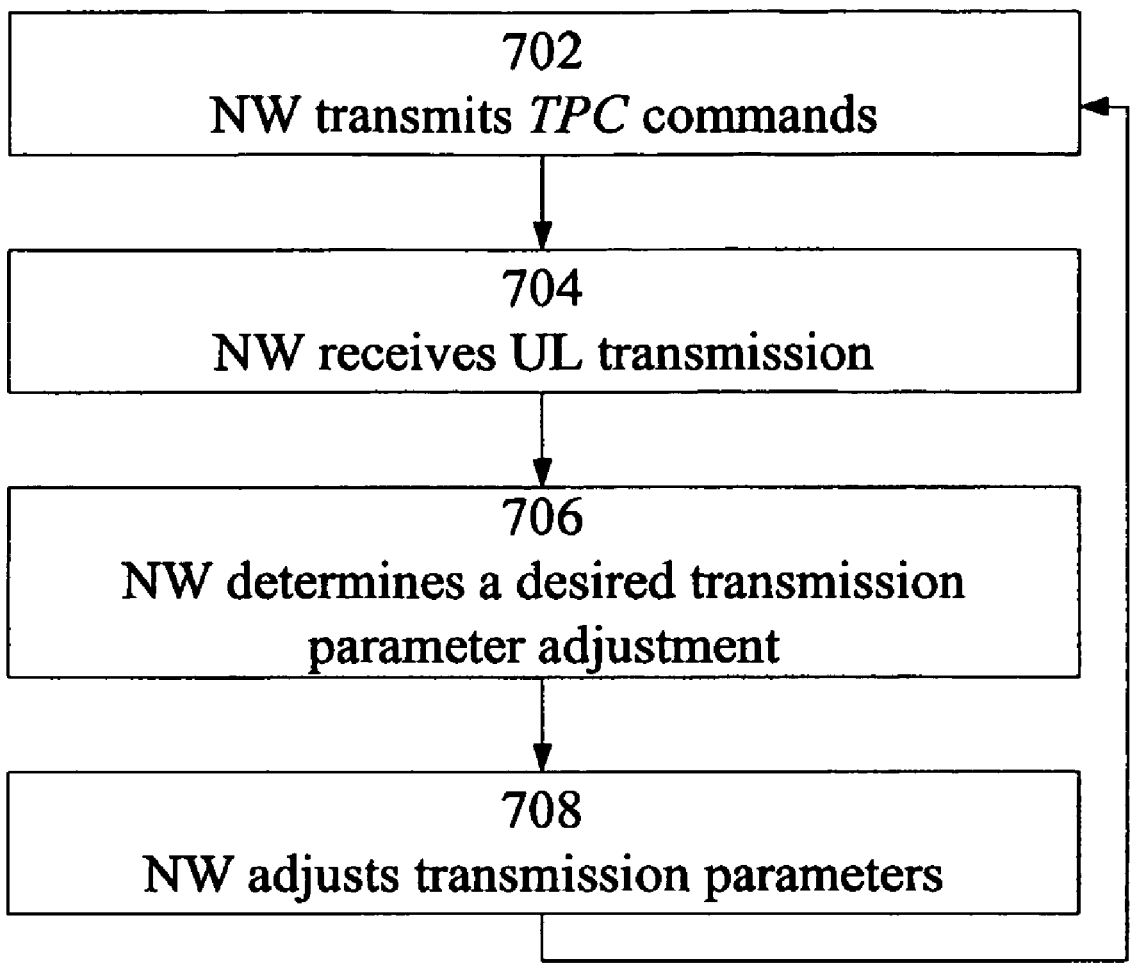
FIG. 7 is a schematic flowchart illustrating a sixth embodiment of the invention as carried out at the network side of a communication system.

FIG. 7 is a schematic flowchart illustrating method steps carried out at the network side of a communication system according some embodiments of the invention. In this embodiment, no indication is transmitted from the UE to the NW, and the NW evaluates the signals received from the UE to determine an indication of the desired transmission parameter adjustment.

To start with, the NW transmits TPC commands (e.g. from Node B) to the UE 702 and receives UL transmissions from the UE 704 as is well defined in the art. Based on the transmitted TPC commands and the received UL transmissions, the NW then determines a desired transmission parameter adjustment 706. For example, this can be done in Node B by evaluating whether the UE has better error performance for data processing than for TPC commands, and/or by studying how well the UE has complied with the transmitted TPC commands. One example of such an evaluation will be described later herein in connection to the embodiment in FIG. 13. The result of the evaluation could for example be an estimated BER of the TPC decoding in the UE, $BER_{TPC}$. That estimated value might be compared to an estimated BER or BLER for the non-TCCS (e.g. data), which is determined according to methods well known in the art, to determine a performance difference between TPC and non-TCCS. Alternatively, $BER_{TPC}$ could be compared with one or more predetermined thresholds.

Finally, the NW adjusts its transmission parameters 708 based on the determined desired transmission parameter adjustment, for example by adding extra power to the TPC portions of the transmitted signal, or by changing the slot format or the encoding scheme. Method steps 702, 704, 706, and 708 might be performed once (e.g. at connection setup), but are typically repeated periodically or on an event driven basis.

One alternative to the embodiment shown in FIG. 7 would be that only a first indication was transmitted comprising information that the UE uses an advanced receiver for non-TCCS, but that the advanced receiver is not used for TCCS. In such a scenario, the NW could just make a predetermined transmission parameter adjustment (such as adding a fix power offset, applying an alternative slot format, etc) without having any information regarding the transmission parameter adjustment actually desired by the UE.

Figure 8:
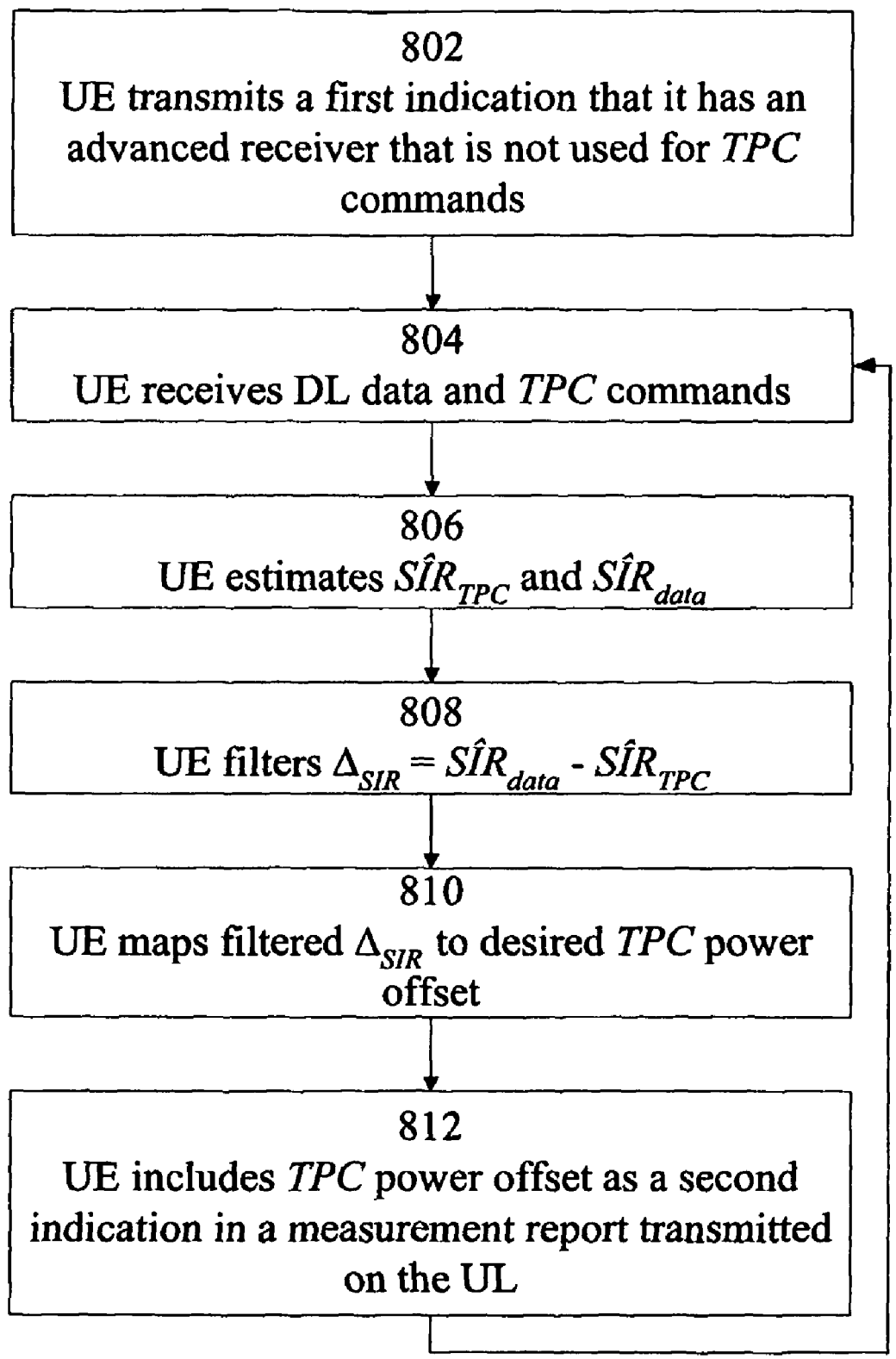
FIG. 8 is a schematic flowchart illustrating a seventh embodiment of the invention as carried out in a wireless terminal.

FIG. 8 is a flowchart illustrating method steps carried out in a wireless terminal according to some embodiments of the invention. The figure describes a UE that determines a desired transmission parameter adjustment and transmits an indication thereof. In this embodiment, the transmission parameter adjustment is represented by a TPC power offset, but the method described is equally applicable to other situations such as when the TCCS comprises the HS-SCCH in HSDPA.

In this embodiment, the UE starts with transmitting a first indication comprising information that it has an advanced receiver that is not used for TPC commands 802. Then, the UE receives DL data and TPC commands 804. In the UE, the DL data is processed by an advanced receiver, and the TPC commands are processed by a less advanced receiver. A performance quality value for each of the advanced and the less advanced receivers is estimated in the UE 806. Any appropriate quantity could be used for the performance quality value, for example estimated BER, BLER, SIR, etc. In this particular embodiment, estimated SIR is used. A SIR estimate is determined for each of the two receivers, the advanced receiver that is used to process the DL data ($\hat{SIR}_{data}$) and the less advanced receiver that is used to process the TPC commands ($\hat{SIR}_{TPC}$), for example by applying equations (1) and (2).

The difference, $\Delta_{SIR}$, between these two performance quality values could constitute a basis for determining the desired transmission parameter adjustment that should be requested from the NW. Optionally, the difference $\Delta_{SIR}$ could be filtered 808 to combat temporary fluctuations in the performance measures.

Then the filtered difference is used to determine the desired transmission parameter adjustment. This could for example be done by mapping the filtered difference to a desired transmission parameter adjustment such as a TPC power offset, a slot format, or an encoding scheme. The mapping could be performed for example by reading entries from a look-up table, or it could be calculated by application of a formula describing the mapping. The filtered difference could alternatively be compared to one or several thresholds to determine if and what type of transmission parameter adjustment is desired.

Then a second indication regarding the desired transmission parameter adjustment is transmitted to the network. In this embodiment, the filtered $\Delta_{SIR}$ is mapped to a desired TPC power offset 810, and the desired TPC power offset is included in a measurement report 812. The measurement report could also include e.g. SIR measurements on neighbouring cells. Method steps 804, 806, 808, 810, and 812 might be performed only once, but are typically repeated periodically or on an event driven basis.

Figure 9:
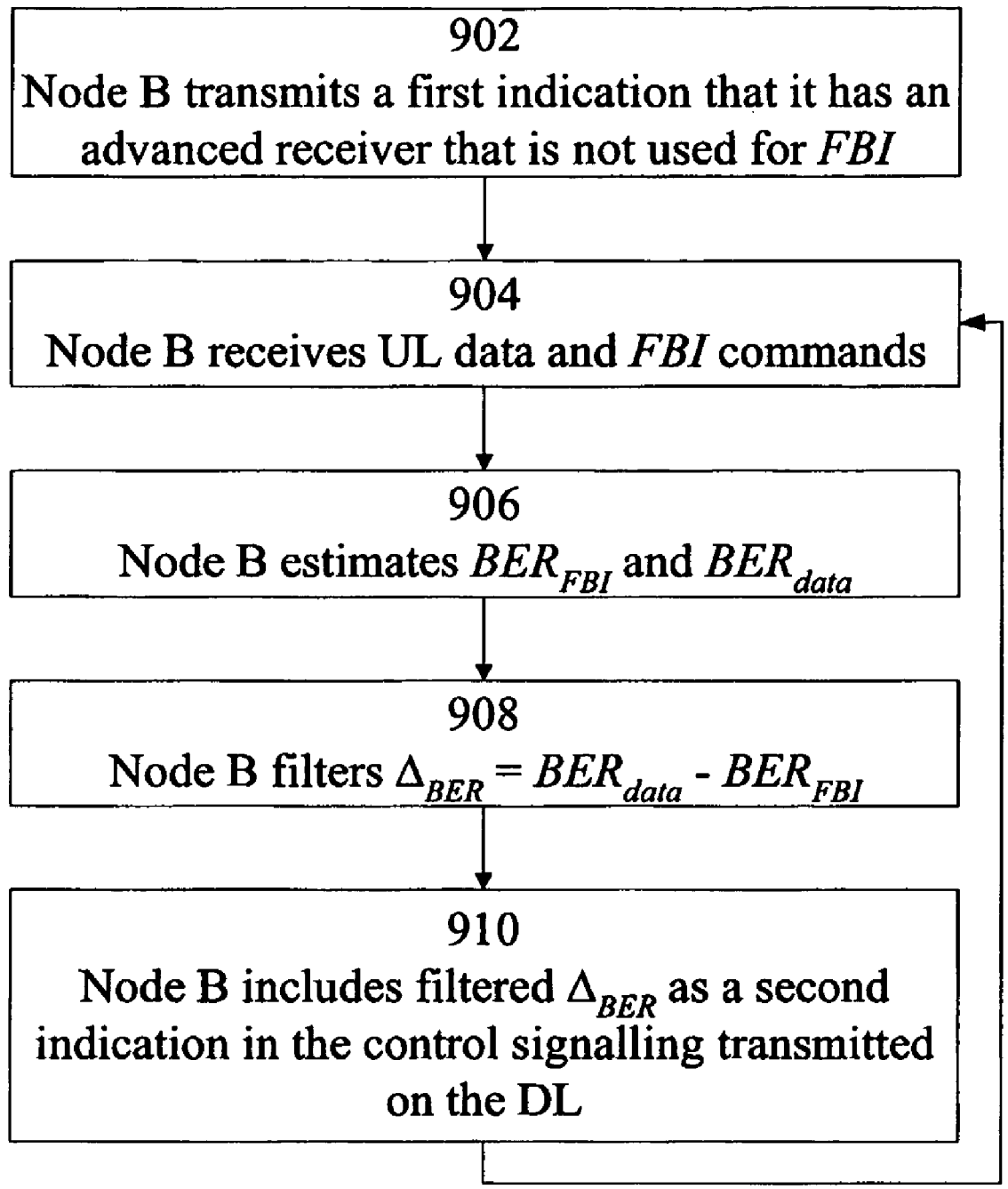
FIG. 9 is a schematic flowchart illustrating an eighth embodiment of the invention as carried out in a base station.

FIG. 9 is a flowchart illustrating method steps carried out in a base station (Node B) according to some embodiments of the invention. In this embodiment, the TCCS comprises FBI commands, but similar method steps can be carried out e.g. when the TCCS comprises TPC commands transmitted in the UL.

In this embodiment, Node B transmits a first indication 902 that it uses an advanced receiver for data processing, but a less advanced receiver (e.g. a conventional RAKE receiver) for the FBI commands. Node B receives UL data and FBI commands transmitted from a UE 904, and processes the UL data using the advanced receiver and the FBI commands using the less advanced receiver. A performance quality value for each of the advanced and the less advanced receivers is estimated in Node B 906. As mentioned before, any appropriate quantity could be used as a performance quality value, e.g. BER, BLER, SIR, etc. In this particular embodiment, estimated BER is used. An estimated BER is determined for each of the two receivers, the advanced receiver that is used for the UL data ($BER_{data}$) and the less advanced receiver that is used for the FBI commands ($BER_{FBI}$).

The difference, $\Delta_{BER}$, between these two performance quality values could constitute a basis for determining the desired transmission parameter adjustment that should be requested from the UE. Optionally, the difference could be filtered 908 to combat temporary fluctuations in the performance measures, and the filtered difference is used to determine the desired transmission parameter adjustment.

This could be done, as in this embodiment, by transmitting the filtered difference and letting the UE determine the desired transmission parameter adjustment based, at least in part, on the filtered difference, or it could be done by mapping the filtered difference to a desired slot format, a desired encoding scheme, or a desired FBI power offset. A desired FBI power offset could be transmitted directly or converted to an up/down command. Then the desired transmission parameter adjustment could be transmitted to the UE as a second indication. In this embodiment, the filtered difference is included as a second indication in the control signalling that is transmitted on the DL 910. The control signalling could also include e.g. acknowledgement messages (ACK/NAK) for packet data transmission, and handover related signalling. When the UE receives the control information it may adjust the FBI transmission parameters accordingly.

Figure 10:
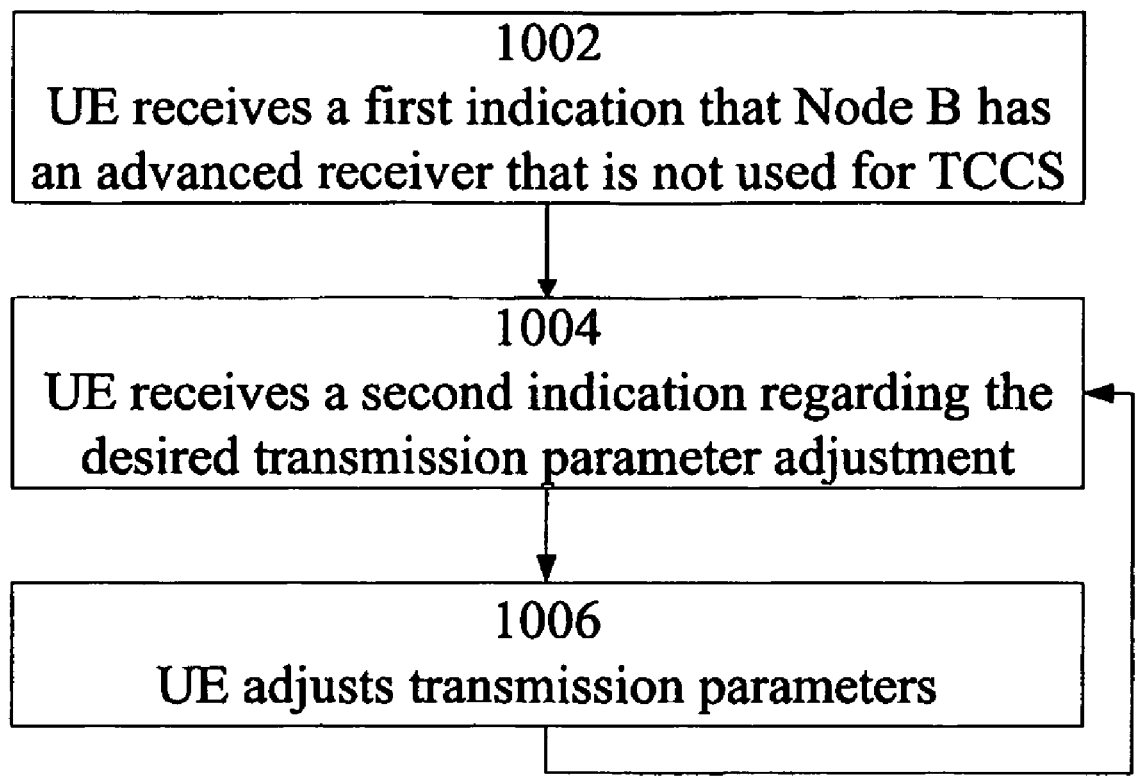
FIG. 10 is a schematic flowchart illustrating a ninth embodiment of the invention as carried out in a wireless terminal.

FIG. 10 is a flowchart illustrating method steps carried out in a wireless terminal (UE) according to some embodiments of the invention. For example, these steps could be carried out in a UE that is connected to a Node B, wherein the Node B is carrying out the method steps according to FIG. 9. In this embodiment, the UE receives a first indication comprising information that Node B uses an advanced receiver for data processing but a less advanced receiver for TCCS (e.g. FBI commands or TPC commands) 1002. Then the UE receives a second indication comprising information regarding a desired transmission parameter adjustment 1004. This second indication could for example be in the form of a filtered performance difference, a desired power offset or slot format. The UE then adjusts its transmission parameters based, at least in part, on the information from the first and second indications 1006.

Figure 11:
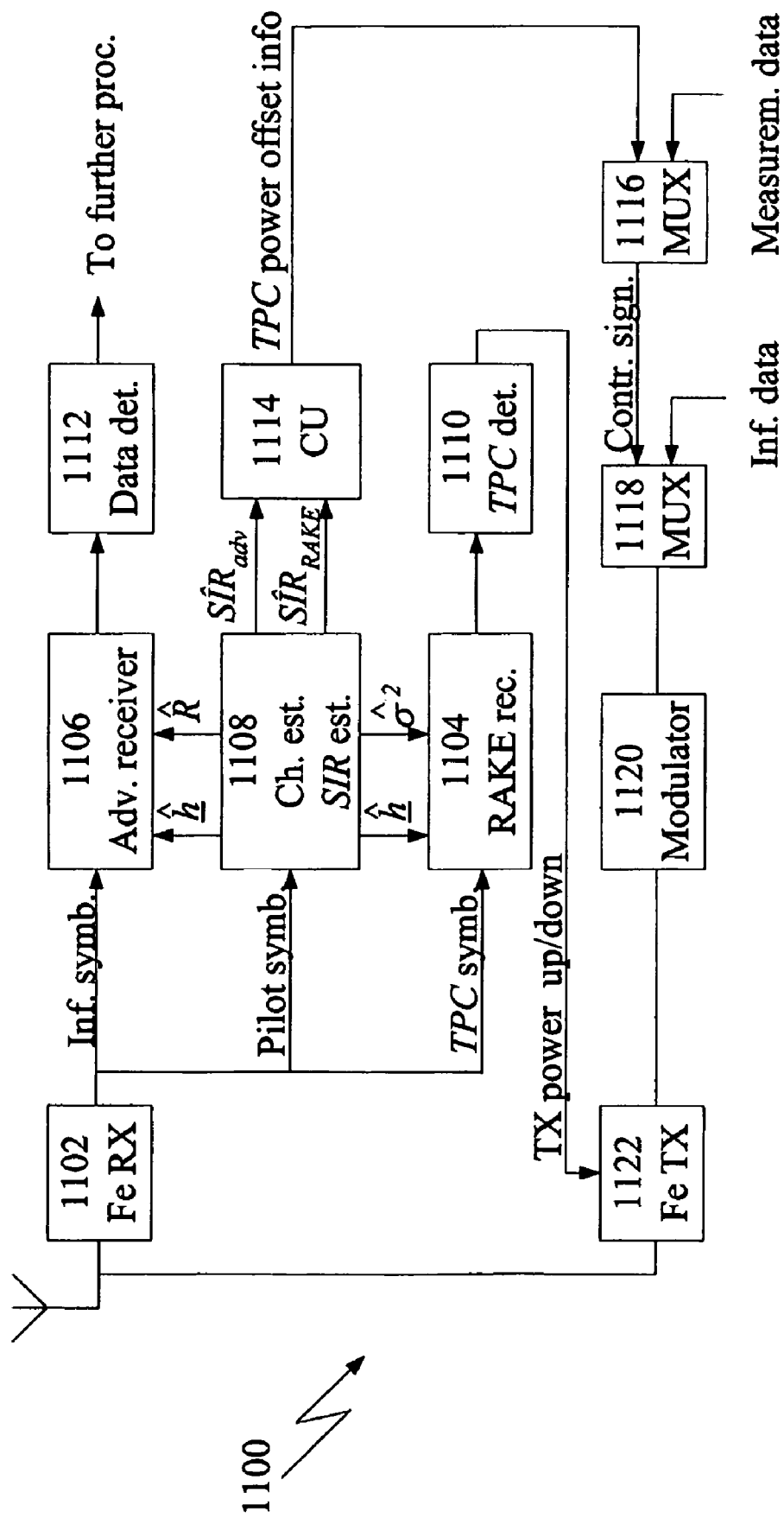
FIG. 11 illustrates an example of an embodiment of the invention by showing a block diagram of a wireless terminal.

A block diagram is shown in FIG. 11 that illustrates parts of a UE 1100 according to some embodiments of the invention. In the front-end receiver (Fe RX) 1102, various processing steps well known in the art are carried out, such as mixing, analogue to digital conversion, filtering, sampling, etc, to produce received symbols (e.g. pilot symbols, information (data) symbols and TPC symbols).

The pilot symbols are input to channel estimation and SIR estimation unit 1108. The channel estimation and SIR estimation unit 1108 produces an estimated channel response $\hat{h}$ and an interference correlation matrix $\hat{R}$, which are both input to an advanced receiver 1106 together with the information data symbols. In this embodiment the advanced receiver 1106 is a G-RAKE receiver, but other advanced receivers could be used according to other embodiments of the invention. If the advanced receiver is not a G-RAKE or some variant of a G-RAKE, the interference correlation matrix $\hat{R}$, might be replaced by some other appropriate information. The advanced receiver 1106 processes the data symbols using the inputs from the channel estimation and SIR estimation unit 1108. The output from the advanced receiver is passed to a data detection unit 1112. The data detection unit 1112 produces symbol decisions (hard or soft), which are passed on to further processing (e.g. decoding).

The TPC symbols are input to a conventional RAKE receiver 1104 together with the estimated channel response $\hat{h}$ and an estimated noise variance $\hat{\sigma}^2$ from the channel estimation and SIR estimation unit 1108. The RAKE receiver 1104 processes the TPC symbols using the inputs from the channel estimation and SIR estimation unit 1108. The output from the RAKE receiver is passed to a TPC detection unit 1110. The TPC detection unit 1110 produces TPC symbol decisions (TPC power up/down) which are passed on to the transmitter front end (Fe TX) 1122 and are used to control the transmit power according to any method known in the art.

The channel estimation and SIR estimation unit 1108 also estimates the SIR of the advanced receiver ($\hat{SIR}_{adv}$) and of the RAKE receiver ($\hat{SIR}_{RAKE}$), for example using equations (1) and (2) respectively. These SIR estimates are input to a control unit (CU) 1114. The control unit 1114 processes the SIR estimates to produce TPC power offset information to be transmitted on the UL. This could for example be done by filtering the difference between the SIR estimates and mapping the filtered difference to a desired power offset as explained before in connection to FIG. 8.

The TPC power offset information is included in the control signalling together with measurement data (e.g. in a measurement report, as defined by the 3GPP standard, comprising RSCP and $E_c/I_0$, where $I_0$=RSSI, RSCP denotes Received Signal Code Power and RSSI denotes Received Signal Strength Indicator) by a multiplexer (MUX) 1116. When, in some embodiments, the indication comprising a desired transmission parameter adjustment (e.g. the TPC power offset information) is transmitted together with the measurement report, that could, for the WCDMA case, typically mean that the indication is transmitted on the DCCH as RRC messages. Such an indication, comprising e.g. information that the UE needs power offset for the TPC commands, might comprise any appropriate number of bits and could typically comprise 2 or 3 bits. The control signalling is in turn input to another multiplexer 1118 together with information data that is to be transmitted on the UL. The symbols to be transmitted (i.e. the output of multiplexer 1118) are put in appropriate format for transmission by modulator 1120 and front-end transmitter 1122 according to methods well know in the art.

It should be noted that the block diagram 1100 of FIG. 11 could also be included in Node B, e.g. for the cases when the TCCS comprises FBI commands or TPC commands transmitted in the UL. For example, in an embodiment applicable to the case when the TCCS comprises FBI commands, the structure in FIG. 11 could be used in Node B with minor modifications. Such modifications might comprise—in addition to replacing all instances of TPC by FBI—that the output of an FBI detection unit (corresponding to 1110) is not connected to a front-end transmitter (corresponding to 1122) but to a weight generator for generating weight factors to be applied to the at least two transmit antennas, and that the FBI power offset info is not multiplexed with measurement data and information data as described above, but rather the FBI power offset info is multiplexed with control information from the RNC and data from the DPCCH.

Figure 12:
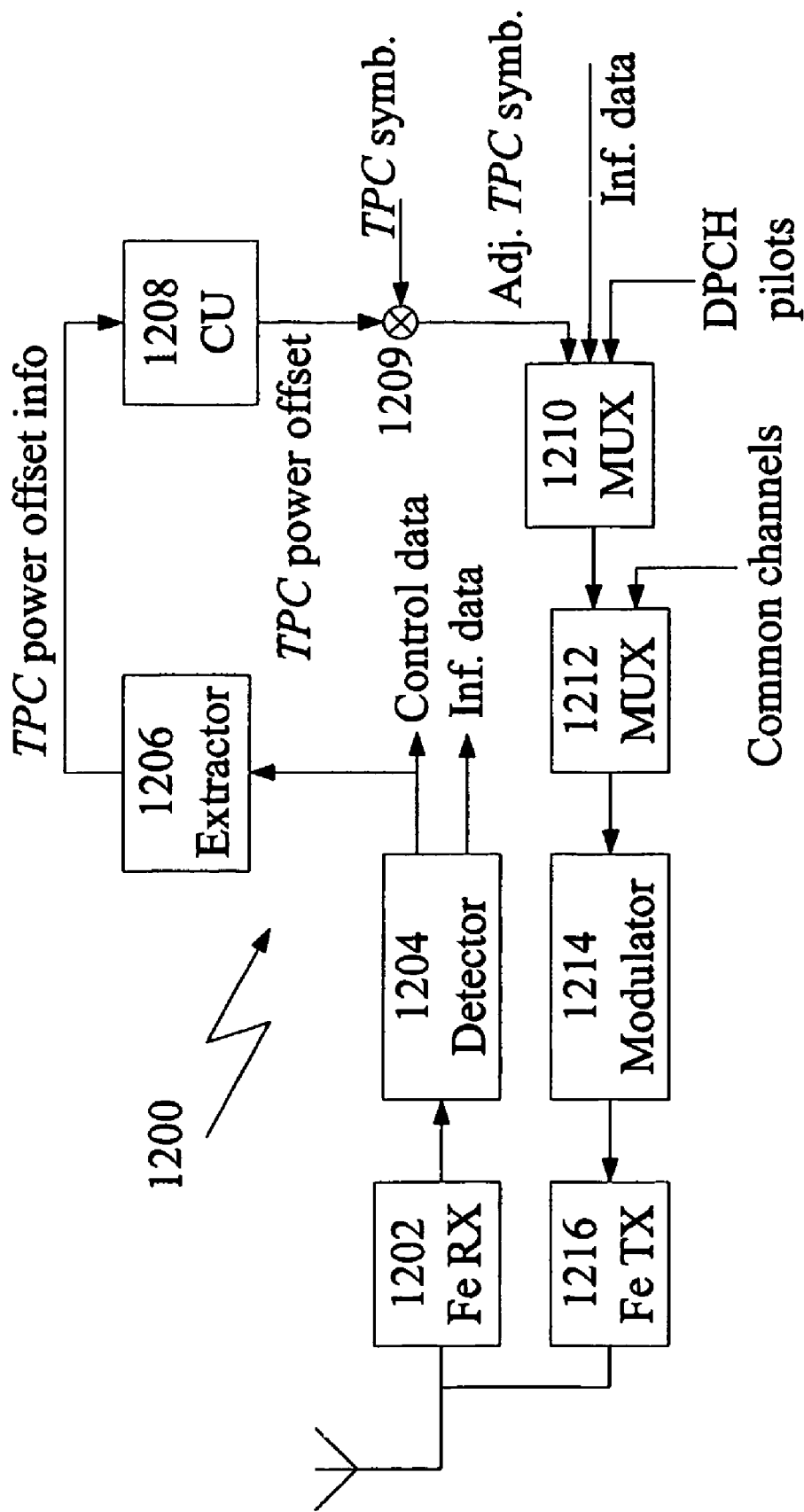
FIG. 12 illustrates another example of an embodiment of the invention by showing a block diagram of parts of an exemplary network—including a Radio Network Controller (RNC) and a base station (Node B)

A block diagram 1200 is shown in FIG. 12 that illustrates components that reside in the base station (Node B) and in the Radio Network Controller (RNC) according to some embodiments of the invention. In this embodiment an indication transmitted from a UE is received and interpreted, and a TPC power offset is adjusted. The front-end receiver (Fe RX) 1202 performs various processing steps to produce received symbols as explained above in connection to FIG. 11. The received symbols are input to a detector 1204 that produces estimated symbols comprising information data and control data according to any method known in the art. The control data is input to an extractor 1206. The extractor 1206 extracts the TPC power offset information from the control data that has been transmitted by a user under consideration.

The TPC power offset information is to be used by the transmitter, and is passed on to a control unit (CU) 1208. If necessary, e.g. if the TPC power offset information is not an actual TPC power offset value, the control unit 1208 converts the TPC power information to a TPC power offset value. The TPC power offset value is multiplied, with the TPC symbol to be transmitted, by multiplier 1209 to produce an adjusted TPC symbol. Note that a multiplication corresponds to an addition in the dB-domain, hence the nomenclature "power offset".

The adjusted TPC symbols are multiplexed with e.g. information data, DPCH pilot symbols and common channels (e.g. BCH, CPICH) by multiplexers 1210 and 1212 as specified by the applicable standard. The symbols to be transmitted (i.e. the output of multiplexer 1212) are then put in appropriate format for transmission by modulator 1214 and front-end transmitter (Fe TX) 1216 according to methods well known in the art. Typically, blocks 1206 and 1208 could be located in either the RNC or Node B, and the other blocks in FIG. 12 could be located in Node B.

It should be noted that the block diagram 1200 of FIG. 12 could also be included in a UE, e.g. for the cases when the TCCS comprises FBI commands or TPC commands transmitted in the UL. For example, in an embodiment where the TCCS comprises FBI commands, the structure in FIG. 12 could be used in the UE with minor modifications. Such modifications might comprise—in addition to replacing all instances of TPC by FBI—that the adjusted FBI symbol is not multiplexed with any common channels.

Figure 13:
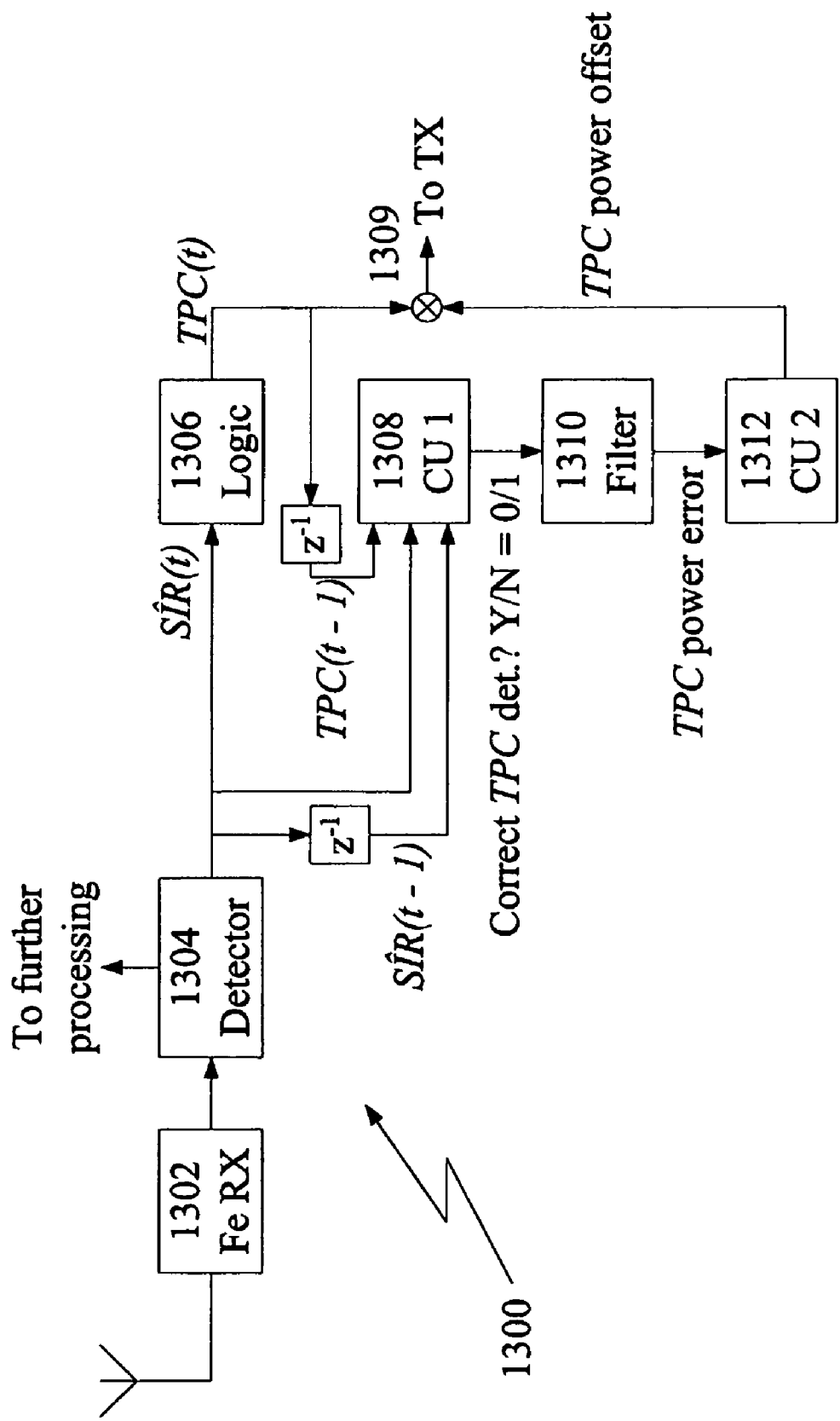
FIG. 13 illustrates yet another example of an embodiment of the invention by showing a block diagram for performing TPC verification and adjusting the TPC power offset accordingly.

FIG. 13 shows a block diagram 1300 that could be used for performing TPC verification and for adjusting the TPC power offset according to some embodiments of the invention. The blocks shown in FIG. 13 could, for example, be configured to perform method steps as specified in connection to FIG. 7. In the embodiment that will be described in the following, the verification and adjustment is performed in Node B. It should be understood, however, that the verification and adjustment can also be done in a UE in a similar manner, e.g. for the case when TPC commands transmitted in the UL are considered.

In this embodiment, all blocks are adapted to perform their tasks for each user under consideration, and hence the estimated values and determinations are all user specific. The front-end receiver (Fe RX) 1302 performs various processing steps to produce received symbols as explained above in connection to FIG. 11. The received symbols are input to a detector 1304 that produces symbol decisions (hard or soft) according to any method known in the art. The symbol decisions are passed on to further processing. The detector 1304 also produces SIR estimates ($\hat{SIR}(t)$), which are input to block 1306. Block 1306 comprises logic adapted to produce TPC commands (TPC(t)), which typically comprise "up/down"-instructions. Logic 1306 can be implemented for example as a comparator in which the estimated SIR is compared to a predetermined or adaptive threshold (e.g. $\hat{SIR}_{ref}$) or as a power control algorithm with an outer and an inner control loop as described before herein and is well known in the art.

The estimated SIR ($\hat{SIR}(t)$) is also input to a control unit (CU 1) 1308 together with the previously estimated SIR ($\hat{SIR}(t-1)$) and the previous TPC command for that particular user (TPC(t−1)). In FIG. 13 the delay elements producing TPC(t−1) and $\hat{SIR}(t-1)$ are shown as separate blocks. However, it should be understood that they could also be part of another block such as e.g. CU 1. Based on its inputs, control unit 1308 determines whether or not the user under consideration has complied with the previously transmitted TPC command (TPC(t−1)). For example, if TPC(t−1) was an "up"-command and if $\hat{SIR}(T) > \hat{SIR}(t-1)$ it could be assumed that the user has complied, if $\hat{SIR}(t) < \hat{SIR}(t-1)$ it could be assumed that the user has not complied, and vice versa if TPC(t−1) was a "down"-command. If the user has not complied, it is assumed that the user has made a detection error in the TPC reception, and that the user probably needs to receive the TPC commands with higher power. In that case the output (Correct TPC detection) of CU 1 1308 could e.g. be set to 1. If, on the other hand, the user has complied with the previous TPC command, it is assumed that the user has detected the TPC command correctly, and that the power used to transmit the TPC commands is sufficient. Then the output of CU 1 1308 could e.g. be set to 0.

The output of control unit 1308 is typically filtered by filter 1310, which may be designed according to any method known in the art. The output (TPC power error) of filter 1310 could, for example, be a value between 0 and 1. If, for example, the filter 1310 produces a mean value of its input, the output (TPC power error) is an estimated BER of the TPC decoding in the UE, $BER_{TPC}$. In any case, the filter output (TPC power error) can be used to determine if a TPC power offset is needed by the user under consideration and, in that case, the desired amount of TPC power offset.

The filter output is input to a second control unit (CU 2) 1312 that converts the TPC power error value to a desired power offset. This conversion could for example be implemented as a thresholding function with one or several thresholds, such that if the input (TPC power error) is less than the lowest threshold no power offset is needed, and the other thresholds determine different amounts of power offsets to be applied. Alternatively, the conversion could be adapted to increase or decrease the current power offset in fixed incremental steps, depending on if the TPC power error is below or above some threshold. The conversion could also be some other mapping function from the input (TPC power error) to TPC power offset, or it could be implemented as a look-up table.

Finally, the TPC command (TPC(t)) is multiplied with the TPC power offset by multiplier 1309 to produce an adjusted TPC command, and the adjusted TPC command is transmitted to the user under consideration.

Although embodiments have been described herein where TCCS comprises FBI or TPC commands, it should be understood that those embodiments are merely examples, and there exist other ways of practising the invention. For example, in HSDPA Channel Quality Index (CQI) values are reported in the UL at regular time intervals. The reported CQI value is based on the SIR experienced by the receiver used to process HS-PDSCH in the UE. Based on the received CQI reports, Node B determines what power, code rate, and symbol alphabet to use for transmissions on the HS-PDSCH. Based on the CQI reports and different assumptions, Node B can also determine a power offset to be used for transmission of the HS-SCCH. That is, the HS-SCCH could be transmitted using a higher transmission power than the HS-PDSCH as determined by the power offset.

According to some embodiments of the invention, the determination of that power offset could be based, at least in part, on at least one indication that in turn is based on the fact that the UE employs two different receivers for HS-SCCH and HS-PDSCH respectively. The HS-SCCH typically has tighter timing requirements, and the receivers typically have different performance as has been described above in connection to the different embodiments. For example, the HS-PDSCH could be processed by a G-RAKE receiver, and the HS-SCCH could be processed by a RAKE receiver. This may result in that the HS-SCCH needs to be received with a higher SIR, and hence the HS-SCCH needs to be transmitted using a higher power than the HS-PDSCH, which can be accomplished by using the power offset.

As described above in connection to the different embodiments of the invention, the at least one indication can comprise a first indication only, or a plurality of indications, and they can be transmitted once, periodically or on an event driven basis. For example, an indication can be transmitted from the UE to Node B at connection setup, in connection with handover messaging, or together with the CQI reports. In some embodiments, no indication is transmitted from the UE to Node B, and Node B evaluates other signals received from the UE to determine a desired transmission parameter adjustment for HS-SCCH.

As explained above, a transceiver as referred to in this application might be a wireless terminal, such as for example (non-exhaustive list) a portable communication apparatus, a mobile phone, a mobile radio terminal, a pager, an electronic organizer, a PDA, a mobile television receiver, or a laptop. Alternatively, a transceiver might be a base station (such as Node B in UMTS), and embodiments of the invention might reside in one or more wireless terminals, base stations, network controllers (such as a RNC), other parts of a serving network, or a combination thereof.

It should also be noted that although method steps have been described, in the embodiments, as performed in a certain order, this does not mean that some of the method steps might not be performed in a different order or in parallel. Further, it should be emphasized that the terms "comprises/comprising" and "includes/including" when used in this specification are taken to specify the presence of stated features, integers, steps, or components, but does not preclude the presence or addition of one or more other features, integers, steps, components, or groups thereof.

Various aspects of the invention have been described herein in connection with a number of illustrative embodiments. To facilitate an understanding of the invention, many aspects of the invention have been described in terms of sequences of actions to be performed by elements of a computer system. It will be recognized that, in each of the embodiments, the various actions could be performed by program instructions being executed by one or more processing circuits (including filters, Digital Signal Processors (DSPs) and other digital processors), memories, specialized circuits (e.g. one or more ASICs, or discrete logic gates interconnected to perform a specialized function), or by a combination thereof. In at least one embodiment, a transceiver includes one or more DSPs and/or Application Specific Integrated Circuits (ASICs) and/or other programmable devices to implement the invention.

Moreover, the invention can additionally be considered to be embodied entirely or in part within any form of computer-readable carrier containing an appropriate set of computer-readable instructions that would cause a processor to carry out the techniques described herein. Examples of computer-readable carriers are a solid-state memory, a magnetic disk (possibly within a drive unit), an optical disk, a programmable logic array (PLA), a flash memory, a Random Access Memory (RAM), an EEROM based memory, a bubble memory storage, a Read Only Memory (ROM), an erasable ROM or carrier wave (such as radio frequency, audio frequency or optical frequency carrier waves). The set of computer-readable instructions may be program code in the form of micro-code, firmware, software, etc. The software may also reside, in whole or in part, in static or dynamic main memories or in firmware within a processor (e.g. within microcontroller, microprocessor, or microcomputer internal memory). More generally, the present invention can be implemented in hardware, software, or essentially any combination thereof, according to the needs of a particular design.

The invention has been described with reference to particular embodiments. However, it will be readily apparent to those skilled in the art that it is possible to embody the invention in specific forms other that those of the embodiments described above. The described embodiments are merely illustrative and should not be considered restrictive in any way. The scope of the invention is given by the appended claims, rather than the preceding description, and all variations and reasonable equivalents that fall within the range of the claims are intended to be embraced therein.

The invention claimed is:

1. A method for controlling transmission parameters in a wireless communication system, in which a first portion and a second portion of signals are transmitted on a physical channel to a first transceiver from a second transceiver, wherein a first receiver processing algorithm is used in the first transceiver to process the first portion of signals received on the physical channel and a second receiver processing algorithm is used in the first transceiver to process the second portion of signals received on the physical channel, wherein the method comprises the steps of:
transmitting an indication indicating that the first and the second receiver processing algorithms are used in the first transceiver to process the first and second portions, respectively, of signals received on the physical channel;
receiving the indication at the second transceiver; and
adjusting, at the second transceiver in response to the indication, a transmission parameter for at least one of the first and second portions of signals to be transmitted on the physical channel to the first transceiver.

2. The method according to claim 1, wherein the indication indicates a desired transmission parameter adjustment.

3. The method according to claim 1, wherein the indication comprises the information that the first and the second receiver processing algorithms are used in the first transceiver to process the first and second portions, respectively, of signals received on the physical channel.

4. The method according to claim 1, wherein the indication indicates a performance difference between the first portion of signals received on the physical channel and the second portion of signals received on the physical channel.

5. The method according to claim 4, wherein the performance difference is a signal-to-interference ratio difference.

6. The method according to claim 1, further comprising:
evaluating the second portion of signals received on the physical channel; and
determining the indication based on the evaluation; wherein the indication indicates a desired power offset to be applied to the second portion of signals to be transmitted on the physical channel.

7. The method according to claim 1, wherein the step of adjusting the transmission parameter comprises at least one of:
applying a power offset to the second portion of the signals of the physical channel;
changing an encoding scheme applied to the second portion of the signals of the physical channel; and
changing a slot format.

8. The method according to claim 1, wherein the indication is transmitted in connection with at least one of:
a power on signalling;
a connection set up;
when a service is requested;
handover control signalling;
when the first transceiver instructs the second transceiver to decrease the transmission power for the first portion of the signals to be transmitted on the physical channel; and
when the first transceiver detects that a quality value of the second portion of the signals of the physical channel falls below a threshold.

9. The method according to claim 1, wherein said first transceiver resides within a base station and said second transceiver resides within a wireless terminal in the wireless communication system.

10. The method according to claim 1, wherein the first transceiver resides within a wireless terminal and the second transceiver resides within a base station in the wireless communication system.

11. The method according to claim 1, wherein the first transceiver resides within a first wireless terminal and the second transceiver resides within a second wireless terminal in the wireless communication system.

12. The method according to claim 1, wherein the physical channel is one of a Dedicated Physical Channel, (DPCH), and a High Speed Synchronisation Control Channel (HS-SCCH) in a wideband code division multiple access system.

13. The method according to claim 1, wherein the second portion of the signals of the physical channel comprises at least one of:
Transmit Power Control (TPC) commands;
High Speed Synchronisation Control Channel (HS-SCCH) signalling; and
Feedback Information (FBI) commands.

14. A method of receiving a first portion and a second portion of signals transmitted on a physical channel of a wireless communication system, the method comprising the steps of:
a first receiver processing algorithm being used to process the first portion of signals received on the physical channel;
a second receiver processing algorithm being used to process the second portion of signals received on the physical channel, and
transmitting an indication that the first and the second receiver processing algorithms are used to process the first and second portions, respectively, of signals received on the physical channel, wherein the indication denotes a performance difference between the first portion of signals received on the physical channel and the second portion of signals received on the physical channel.

15. The method according to claim 14, wherein the indication indicates a desired transmission parameter adjustment.

16. The method according to claim 14, wherein the indication comprises the information that the first and the second receiver processing algorithms are used in the first transceiver to process the first and second portions, respectively, of signals received on the physical channel.

17. The method according to claim 14, wherein the performance difference is a signal-to-interference ratio difference.

18. The method according to claim 14, further comprising:
evaluating the second portion of signals received on the physical channel; and
determining the indication based on the evaluation; wherein the indication indicates a desired power offset to be applied to the second portion of signals of the physical channel.

19. The method according to claim 14, wherein the physical channel is one of a Dedicated Physical Channel (DPCH), and a High Speed Synchronisation Control Channel (HS-SCCH) in a wideband code division multiple access system.

20. The method according to claim 14, wherein the second portion of the signals of the physical channel comprises at least one of:
Transmit Power Control (TPC) commands;
High Speed Synchronisation Control Channel (HS-SCCH) signalling; and
Feedback Information (FBI) commands.

21. The method according to claim 14, wherein the first receiver processing algorithm is one of a generalized RAKE receiver processing algorithm, an interference cancelling receiver processing algorithm, and a chip equalizer processing algorithm and the second receiver processing algorithm is a RAKE receiver processing algorithm.

22. A method of transmitting a first portion and a second portion of signals on a physical channel from a transceiver to each of a number of remote transceivers in a wireless communication system, the method comprising the steps of:
transmitting signals on the physical channels;
receiving control signalling from the remote transceivers;
adjusting, if control signalling received from a specific remote transceiver comprises an indication indicating that said specific remote transceiver uses a first receiver processing algorithm to process the first portion of signals received on the physical channel and a second receiver processing algorithm to process the second portion of signals received on the physical channel, a transmission parameter for at least one of the first and second portion of signals to be transmitted on the physical channel to that specific remote transceiver, in dependence of said indication.

23. The method according to claim 22, further comprising the steps of:
evaluating the control signaling received from the specific remote transceiver, if the control signaling is free from the indication; and determining the indication based on the evaluation.

24. The method according to claim 22, wherein the step of adjusting the transmission parameter comprises at least one or:
applying a power offset to the second portion of the signals to be transmitted on the physical channel;
changing an encoding scheme applied to the second portion to be transmitted on the signals of the physical channel; and
changing a slot format.

25. The method according to claim 22, wherein the physical channel is one of a Dedicated Physical Channel (DPCH), and a High Speed Synchronisation Control Channel (HS-SCCH) in a wideband code division multiple access system.

26. The method according to claim 22, wherein the second portion of the signals of the physical channel comprises at least one of:
Transmit Power Control (TPC) commands;
High Speed Synchronisation Control Channel (HS-SCCH) signalling; and
Feedback Information (FBI) commands.

27. A wireless communication system comprising:
a first transceiver for receiving a first portion and a second portion of signals transmitted on a physical channel, the first transceiver comprising:
a first receiver adapted to process the first portion of signals received on the physical channel; and
a second receiver adapted to process the second portion of signals received on the physical channel; and
a second transceiver for transmitting the first portion and the second portion of signals on the physical channel to the first transceiver, the second transceiver comprising:
a transmitter adapted to transmit signals on the physical channel;
wherein the first transceiver further comprises
a transmitter adapted to transmit an indication that the first transceiver uses the first receiver to process the first portion of signals received on the physical channel and the second receive to process the second portion of signals received on the physical channel;
the second transceiver comprises
a receiver adapted to receive the indication from the first transceiver; and
the second transceiver further comprises
a controller adapted to adjust a transmission parameter for at least one of the first and second portions of the signals to be transmitted on the physical channel to the first transceiver in dependence of said indication.

28. A transceiver for receiving a first portion and a second portion of signals transmitted on a physical channel in a wireless communication system, the transceiver comprising:
a first receiver adapted to process the first portion of signals received on the physical channel; and
a second receiver adapted to process the second portion of signals received on the physical channel;
the transceiver further being adapted to determine a performance difference between the first portion of signals received on the physical channel and the second portion of signals received on the physical channel and to produce the indication based on the performance difference, and the transceiver further comprising a transmitter adapted to transmit the indication that the transceiver uses the first receiver to process the first portion of signals received on the physical channel and the second receiver to process the second portion of signals received on the physical channel.

29. The transceiver according to claim 28, wherein the indication indicates a desired transmission parameter adjustment.

30. The transceiver according to claim 28, wherein the indication comprises the information that the first and the second receivers are used in the first transceiver to process the first and second portions, respectively, of signals received on the physical channel.

31. The transceiver according to claim 28, wherein the performance difference is a signal-to-interference ratio difference.

32. The transceiver according to claim 28, wherein a channel estimation and signal-to-noise ratio estimation unit and a control unit are adapted to produce the indication.

33. The transceiver according to claim 28, further being adapted to evaluate the second portion of signals received on the physical channel; and to determine the indication based on the evaluation; wherein the indication indicates a desired power offset to be applied to the second portion of signals of the physical channel.

34. The transceiver according to claim 28, wherein the transceiver resides within a wireless terminal.

35. The transceiver according to claim 28, wherein the transceiver resides within at least one of a base station and a network controller.

36. The transceiver according to claim 28, wherein the transceiver is a wideband code division multiple access transceiver, and wherein the physical channel is one of a Dedicated Physical Channel (DPCH) and a High Speed Synchronisation Control Channel (HS-SCCH).

37. The transceiver according to claim 28, wherein the second portion of the signals of the physical channel comprises at least one of:
Transmit Power Control (TPC) commands;
High Speed Synchronisation Control Channel (HS-SCCH) signalling; and
Feedback Information (FBI) commands.

38. The transceiver according to claim 28, wherein the first receiver is one of a generalized RAKE receiver, an interference-cancelling receiver, and a chip equalizer and the second receiver is a RAKE receiver.

39. A transceiver for transmitting a first portion and a second portion of signals on a physical channel to each of a number of remote transceivers in a wireless communication system, the transceiver comprising:
a transmitter adapted to transmit signals on the physical channels; and
a receiver adapted to receive control signalling from the remote transceivers;
wherein the transceiver further comprises a controller adapted to adjust, if control signalling received from a specific remote transceiver comprises an indication indicating that said specific remote transceiver uses a first receiver to process the first portion of signals received on the physical channel and a second receiver to process the second portion of signals received on the physical channel, a transmission parameter for at least one of the first and second portions of the signals to be transmitted on the physical channel to that specific remote transceiver in dependence of said indication.

40. The transceiver according to claim 39, wherein the indication indicates a performance difference between the first portion of signals on the physical channel and the second portion of signals of the physical channel; and wherein the controller is adapted to adjust the transmission parameter in dependence of the performance difference.

41. The method according to claim 40, wherein the performance difference is a signal-to-interference ratio difference.

42. The transceiver according to claim 39, further comprising a control unit adapted to evaluate the control signaling received from the specific remote transceiver, if the control signaling is free from the indication; and means adapted to determine the indication based on the evaluation.

43. The transceiver according to claim 39, wherein the controller is adapted to adjust a transmission parameter is further adapted to perform at least one of:
   applying a power offset to the second portion of the signals to be transmitted on the physical channel;
   changing an encoding scheme applied to the second portion of the signals to be transmitted on the physical channel; and
   changing a slot format.

44. The transceiver according to claim 39, wherein the transceiver resides within a base station in a wireless communication system.

45. The transceiver according to claim 39, wherein the transceiver resides within a wireless terminal in a wireless communication system.

46. The transceiver according to claim 39, wherein the transceiver is a wideband code division multiple access transceiver, and wherein the physical channel is one of a Dedicated Physical Channel (DPCH) and a High Speed Synchronisation Control Channel (HS-SCCH).

47. The transceiver according to claim 39, wherein the second portion of the signals of the physical channel comprises at least one of:
   Transmit Power Control (TPC) commands;
   High Speed Synchronisation Control Channel (HS-SCCH) signalling; and
   Feedback Information (FBI) commands.

* * * * *

UNITED STATES PATENT AND TRADEMARK OFFICE
CERTIFICATE OF CORRECTION

PATENT NO. : 7,885,608 B2
APPLICATION NO. : 11/722237
DATED : February 8, 2011
INVENTOR(S) : Nilsson et al.

Page 1 of 1

It is certified that error appears in the above-identified patent and that said Letters Patent is hereby corrected as shown below:

On the Title Page, in Field (75), under "Inventors", in Column 1, Line 1, delete "Höllyiken" and insert -- Höllviken --, therefor.

In Column 15, Line 19, delete "ASR" and insert -- $\Delta_{SIR}$ --, therefor.

In Column 20, Line 38, delete "SÎR(T)>SÎR(t-1)" and insert -- SÎR(t)>SÎR(t-l) --, therefor.

In Column 23, Line 58, in Claim 12, delete "Channel, (DPCH)," and insert -- Channel (DPCH), --, therefor.

In Column 25, Line 12, in Claim 24, delete "or:" and insert -- of: --, therefor.

In Column 25, Line 46, in Claim 27, delete "receive" and insert -- receiver --, therefor.

Signed and Sealed this
Thirty-first Day of May, 2011

David J. Kappos
*Director of the United States Patent and Trademark Office*